(12) United States Patent
Udagawa et al.

(10) Patent No.: US 11,274,418 B2
(45) Date of Patent: Mar. 15, 2022

(54) HYDRAULIC WORK MACHINE

(71) Applicant: Hitachi Construction Machinery Co., Ltd., Tokyo (JP)

(72) Inventors: Tsutomu Udagawa, Tsukuba (JP); Shigeyuki Sakurai, Tsukuba (JP); Yukihito Suzuki, Tsukuba (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 383 days.

(21) Appl. No.: 16/493,052

(22) PCT Filed: Aug. 9, 2018

(86) PCT No.: PCT/JP2018/029869
§ 371 (c)(1),
(2) Date: Sep. 11, 2019

(87) PCT Pub. No.: WO2019/049603
PCT Pub. Date: Mar. 14, 2019

(65) Prior Publication Data
US 2020/0018043 A1 Jan. 16, 2020

(30) Foreign Application Priority Data
Sep. 7, 2017 (JP) .............................. JP2017-172515

(51) Int. Cl.
*E02F 9/22* (2006.01)
*E02F 9/26* (2006.01)
(Continued)

(52) U.S. Cl.
CPC .......... *E02F 9/2235* (2013.01); *B62D 11/005* (2013.01); *E02F 9/02* (2013.01);
(Continued)

(58) Field of Classification Search
None
See application file for complete search history.

(56) References Cited

U.S. PATENT DOCUMENTS 9,140,275 B2 * 9/2015 Dengler ................... F16H 61/47
10,407,073 B2 * 9/2019 Scheibel ............... B60T 8/3205
(Continued)

FOREIGN PATENT DOCUMENTS

CN 102326065 A 1/2012
CN 102483056 A 5/2012
(Continued)

OTHER PUBLICATIONS

Korean language Office Action issued in Korean Application No. 10-2019-7025933 dated May 23, 2021 (six (6) pages).
(Continued)

*Primary Examiner* — Michael Leslie
(74) *Attorney, Agent, or Firm* — Crowell & Moring LLP

(57) ABSTRACT

A hydraulic work machine is provided in which left and right hydraulic motors are driven independently of each other by two hydraulic pumps and in which an anomaly of any of the left and right track devices can be detected with high accuracy. The hydraulic work machine includes a first pressure sensor 13 configured to detect a first pump pressure that is a delivery pressure of a first hydraulic pump 11 and a second pressure sensor 23 configured to detect a second pump pressure that is a delivery pressure of a second hydraulic pump 21. When a controller 2 decides, from detection results of a travel operation detector 5 and work operation detectors 3 and 4, that a work implement 103 is not operated but travel operation devices 6 and 7 are operated and besides left and right track devices 50 and 60 are straightly traveling, the controller 2 calculates an anomaly decision evaluation value based on a pressure difference value obtained by subtracting one from the other of the first
(Continued)

pump pressure and the second pump pressure and decides, based on a result of comparison between the anomaly decision evaluation value and a predetermined decision reference value 84, that one of the left and right track devices has an anomaly.

7 Claims, 19 Drawing Sheets

(51) Int. Cl.
| | |
|---|---|
| *F15B 21/00* | (2006.01) |
| *F15B 11/17* | (2006.01) |
| *F15B 19/00* | (2006.01) |
| *E02F 9/02* | (2006.01) |
| *E02F 9/20* | (2006.01) |
| *F04B 49/00* | (2006.01) |
| *B62D 11/00* | (2006.01) |
| *E02F 3/32* | (2006.01) |

(52) U.S. Cl.
CPC .......... *E02F 9/2004* (2013.01); *E02F 9/2271* (2013.01); *E02F 9/2292* (2013.01); *E02F 9/2296* (2013.01); *E02F 9/26* (2013.01); *E02F 9/267* (2013.01); *F04B 49/007* (2013.01); *F15B 11/17* (2013.01); *F15B 19/005* (2013.01); *F15B 21/001* (2013.01); *E02F 3/32* (2013.01)

(56) References Cited

U.S. PATENT DOCUMENTS

| | | |
|---|---|---|
| 2012/0041663 A1 | 2/2012 | Suzuki et al. |
| 2012/0185141 A1 | 7/2012 | Kamado et al. |
| 2013/0287601 A1 | 10/2013 | Mori et al. |

FOREIGN PATENT DOCUMENTS

| | | |
|---|---|---|
| CN | 103299087 A | 9/2013 |
| CN | 105986592 A | 10/2016 |
| JP | 3-65769 U | 6/1991 |
| JP | 9-32041 A | 2/1997 |
| JP | 2003-148419 A | 5/2003 |
| JP | 2005-344818 A | 12/2005 |
| JP | 2010-148435 A | 7/2010 |
| JP | 2014-9566 A | 1/2014 |
| JP | 5499334 B2 | 5/2014 |
| JP | 2015-135031 A | 7/2015 |
| JP | 5974684 B2 | 8/2016 |
| KR | 10-2006-0096081 A | 9/2006 |
| KR | 10-2014-0023731 A | 2/2014 |
| WO | WO 2012/093703 A1 | 7/2012 |

OTHER PUBLICATIONS

Japanese-language Office Action issued in Japanese Application No. 2017-172515 dated Apr. 28, 2020 with English machine translation (9 pages).

International Preliminary Report on Patentability (PCT/IB/338 & PCT/IB/373) issued in PCT Application No. PCT/JP2018/029869 dated Mar. 19, 2020, including English translation of document C2 (Japanese-language Written Opinion (PCT/ISA/237) previously filed on Sep. 11, 2019) six pages.

International Search Report (PCT/ISA/210) issued in PCT Application No. PCT/JP2018/029869 dated Sep. 25, 2018 with English translation (four (4) pages).

Japanese-language Written Opinion (PCT/ISA/237) issued in PCT Application No. PCT/JP2018/029869 dated Sep. 25, 2018 (four (4) pages).

Chinese-language Office Action issued in Chinese Application No. 2018800156670.7 dated Jan. 22, 2021 (7 pages).

Korean-language Office Action issued in Korean Application No. 10-2019-7025933 dated Nov. 2, 2020 (six (6) pages).

* cited by examiner

HYDRAULIC WORK MACHINE

TECHNICAL FIELD

The present invention relates to a hydraulic work machine that includes left and right track devices, such as a hydraulic excavator.

BACKGROUND ART

As a prior art relating to anomaly detection of a hydraulic rotary device such as a hydraulic motor, for example, Patent Document 1 is available.

In Patent Document 1, a wear detection apparatus for a hydraulic rotary device in a hydraulic work machine (construction machine) including at least two or more hydraulic rotary devices that are driven by boosted hydraulic fluid is disclosed. The wear detection apparatus includes a merging circuit that merges hydraulic fluid from outflow ports of the plurality of hydraulic rotary devices, a shunting circuit that shunts and supplies the boosted hydraulic working fluid to inflow ports of the plurality of hydraulic rotary devices, a plurality of temperature detection sections individually provided at equivalent locations of the plurality of hydraulic rotary devices, a plurality of temperature measurement means for measuring temperatures at the temperature detection sections, and computation means for taking in temperature signals from the temperature detection sections measured by the temperature measurement means and performing comparison computation to detect wear of the plurality of hydraulic rotary devices.

PRIOR ART DOCUMENT

Patent Document

Patent Document 1: Japanese Patent No. 5499334

SUMMARY OF THE INVENTION

Problem to be Solved by the Invention

According to the wear detection apparatus for a hydraulic rotary device disclosed in Patent Document 1, although failure or wear of the left and right track hydraulic motors provided on the hydraulic work machine can be detected, an anomaly (increase of frictional force) in a speed reducer driven by the track hydraulic motor, a sprocket wheel, a track link (chain), an idler for supporting the trajectory of the track link, a roller and so forth cannot be detected.

Further, the wear detection apparatus for a hydraulic rotary device disclosed in Patent Document 1 adopts a method of detecting wear of the hydraulic rotary devices used as hydraulic motors in a state in which a temperature condition and a load condition are adjusted between the plurality of hydraulic rotary devices, and includes the merging circuit that merges hydraulic working fluid from the outflow ports of the plurality of hydraulic rotary devices and the shunting circuit that shunts and supplies the boosted hydraulic working fluid to the inflow ports of the plurality of hydraulic rotary devices. Therefore, the wear detection apparatus for a hydraulic rotary device cannot be applied to a hydraulic work machine in which left and right track hydraulic motors are driven independently of each other by two hydraulic pumps.

The present invention has been made in view of the subject described above, and the object of the present invention resides in provision of a hydraulic work machine in which left and right hydraulic motors are driven independently of each other by two hydraulic pumps and in which an anomaly of any of the left and right track devices can be detected with high accuracy.

Means for Solving the Problem

In order to achieve the object described above, according to the present invention, there is provided a hydraulic work machine including: a first hydraulic pump and a second hydraulic pump of variable displacement type; a left track device including a left track hydraulic motor driven by hydraulic fluid supplied from the first hydraulic pump; a right track device including a right track hydraulic motor driven by hydraulic fluid supplied from the second hydraulic pump; a hydraulic actuator driven by hydraulic fluid supplied from at least one of the first hydraulic pump and the second hydraulic pump; a work implement driven by the hydraulic actuator; a travel operation device for operating the left track device and the right track device; a work operation device for operating the work implement; a controller that controls pump displacements of the first hydraulic pump and the second hydraulic pump in response to an operation of the travel operation device; a travel operation detector that detects operation contents of the travel operation device; and a work operation detector that detects operation contents of the work operation device, in which the hydraulic work machine further including a first pressure detector configured to detect a first pump pressure that is a delivery pressure of the first hydraulic pump, and a second pressure detector configured to detect a second pump pressure that is a delivery pressure of the second hydraulic pump, and when the controller decides from detection results of the travel operation detector and the work operation detector that the work implement is not operated but the travel operation device is operated and besides the left track device and the right track device are straightly traveling, the controller calculates an anomaly decision evaluation value based on a value obtained by subtracting one from other of the first pump pressure and the second pump pressure and decides based on a result of comparison between the anomaly decision evaluation value and a predetermined decision reference value that one of the left track device and the right track device has an anomaly.

According to the present invention configured in such a manner as described above, by calculating, during single travel operation and besides during straight travel (when both of the left and right track devices are driven equally by the first and second pumps), an anomaly decision evaluation value based on a differential pressure value obtained by subtracting one of the first and second pump pressures from the other and comparing the anomaly decision evaluation value with the predetermined decision reference value, an anomaly of one of the left and right track devices can be detected.

Further, by calculating an anomaly decision evaluation value based on a differential pressure value obtained by subtracting one of the first pump pressure and the second pump pressure from the other, the influences of a change of the hydraulic fluid temperature, time-dependent deterioration of the left and right track devices and so forth on the first and second pump pressures cancel each other, and therefore, the accuracy in anomaly detection of the left and right track devices can be improved.

Advantages of the Invention

According to the present invention, in a hydraulic work machine in which left and right hydraulic motors are driven independently of each other by two hydraulic pumps, an anomaly of any of the left and right track devices can be detected with high accuracy.

MODES FOR CARRYING OUT THE INVENTION

Figure 1:
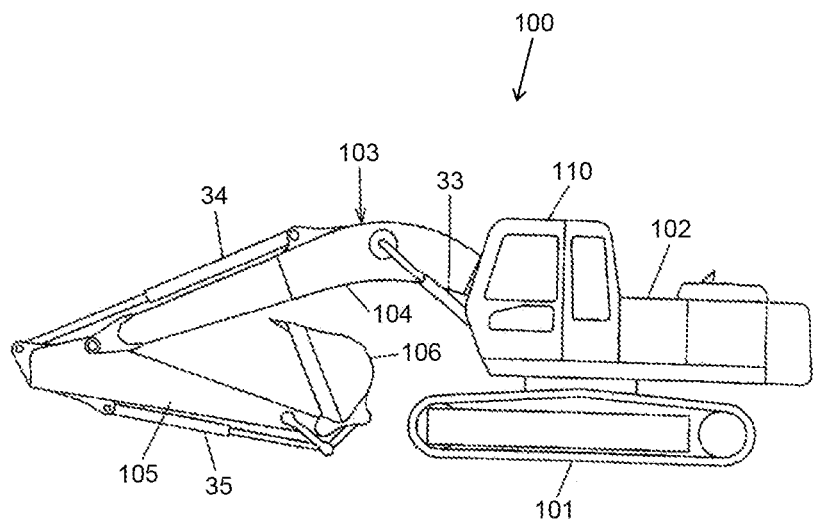
FIG. 1 is a side elevational view of a hydraulic excavator according to a first embodiment of the present invention.

In the following, a hydraulic work machine according to an embodiment of the present invention is described with reference to the drawings taking a hydraulic excavator as an example. It is to be noted that like members in the figures are denoted by like reference characters and overlapping description of them is suitably omitted herein.

First Embodiment

FIG. 1 is a side elevational view of a hydraulic excavator according to a first embodiment of the present invention.

Referring to FIG. 1, the hydraulic excavator 100 includes a lower track structure 101, an upper swing structure 102 mounted swingably on the lower track structure 101, and a front work implement 103 attached to the front side of the upper swing structure 102.

The front work implement 103 includes: a boom 104 attached pivotably in upward and downward directions at a right side front portion of the upper swing structure 102; an arm 105 attached pivotably in upward and downward directions and forward and rearward directions to a distal end portion of the boom 104; a bucket 106 attached pivotably in upward and downward directions and forward and rearward directions to a distal end portion of the arm 105; a boom cylinder 33 as a hydraulic actuator for driving the boom 104; an arm cylinder 34 as a hydraulic actuator for driving the arm 105; and a bucket cylinder 35 as a hydraulic actuator for driving the bucket 106. An operation room 110 is provided at a left side front portion of the upper swing structure 102. In the operation room 110, left and right travel lever devices 6 and (depicted in FIG. 5) as travel operation devices for operating the lower track structure 101, left and right operation lever devices 8 and 9 (depicted in FIG. 5) as work operation devices for operating the upper swing structure 102, the front work implement 103 and the like are provided.

Figure 2:
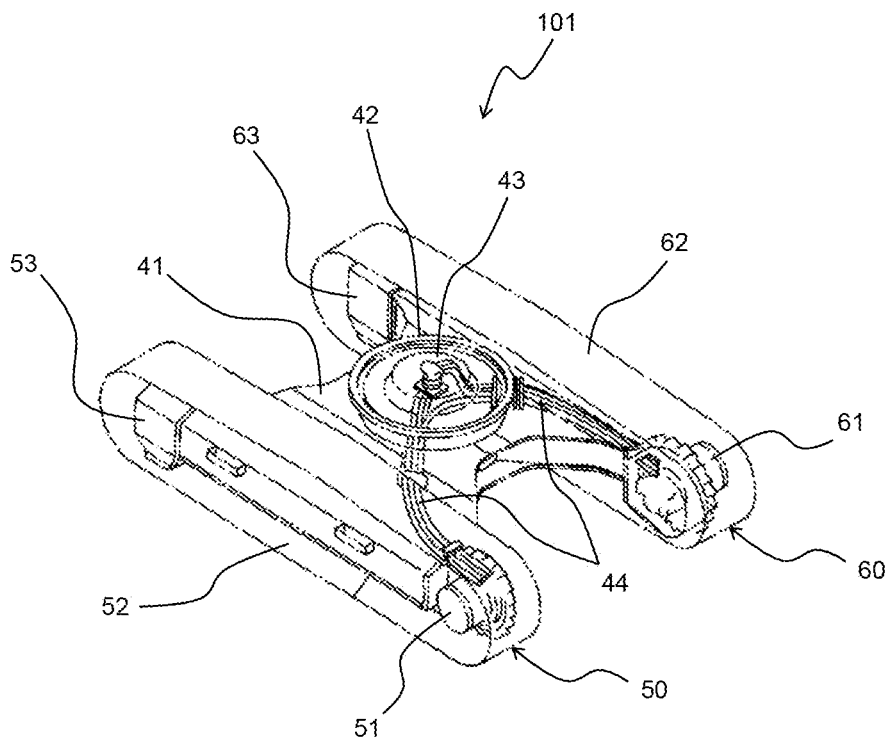
FIG. 2 is a perspective view of a lower track structure depicted in FIG. 1.

FIG. 2 is a perspective view of the lower track structure 101 depicted in FIG. 1.

Referring to FIG. 2, the lower track structure 101 includes a track frame 41 and left and right track devices 50 and 60 provided on the left and the right of the track frame 41. The left and right track devices 50 and 60 include left and right track drive devices 51 and 61, left and right crawler belts (track links and shoes) 52 and 62 driven by the left and right track drive devices 51 and 61, left and right front idlers 53 and 63 for supporting the left and right crawler belts 52 and 62, and left and light upper and lower rollers (not depicted), respectively.

Figure 3:
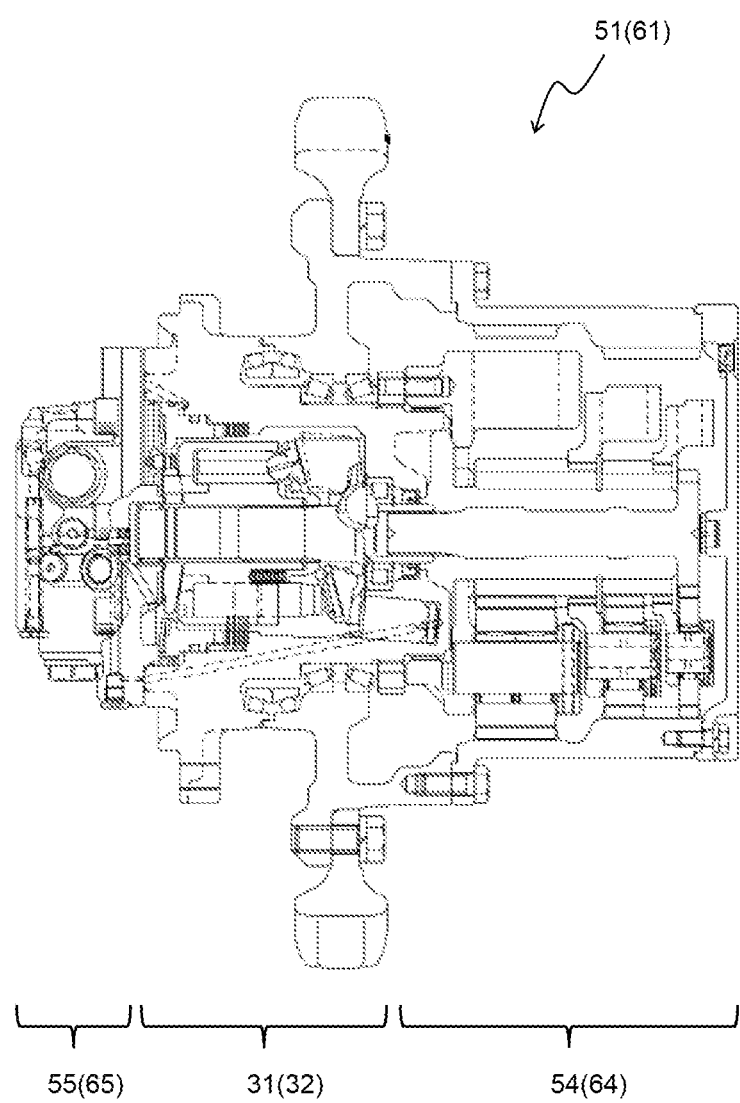
FIG. 3 is a sectional view of left and right track drive devices depicted in FIG. 2.

FIG. 3 is a sectional view of the left and right track drive devices 51 and 61 depicted in FIG. 2. As depicted in FIG. 3, the left track drive device 51 integrally includes a left track motor 31 formed from a hydraulic motor, a left travel speed reducer 54 driven by the left track motor 31 and a left brake valve 55 for braking the left track motor 31. Similarly, the right track drive device 61 integrally includes a right track motor 32 formed from a hydraulic motor, a right travel speed reducer 64 driven by the right track motor 32, and a right brake valve 65 for braking the right track motor 32.

Since the left and right track devices 50 and 60 are configured from a large number of driving force transmission members as described above and are used in a severe environment in which they frequently contact with earth and sand, rainwater and so forth, they are likely to suffer from failure. As a supposed failure, wear and galling or seizure of sliding portions of a bearing or a piston, tooth surface wear or tooth missing of gears, shaft breakage and so forth are available.

Referring back to FIG. 2, a swing wheel 42 for swingably connecting the upper swing structure 102 is provided at an upper portion of the track frame 41. At a center position of the swing wheel 42, a center joint 43 for circulating hydraulic fluid between the lower track structure 101 and the upper swing structure 102 is disposed. The left and right track drive devices 51 and 61 and the center joint 43 are connected to each other by conduits 44.

Since the lower track structure 101 has a mechanism for connecting the upper swing structure 102 pivotably as described above, it is not easy to install a sensor and so forth on the lower track structure 101. However, in the hydraulic excavator 100 according to the present invention, since anomaly decision of the left and right track devices 50 and 60 can be performed on the basis of first and second pump pressures as hereinafter described, there is no necessity to install a sensor or the like on the lower track structure 101.

Figure 4:
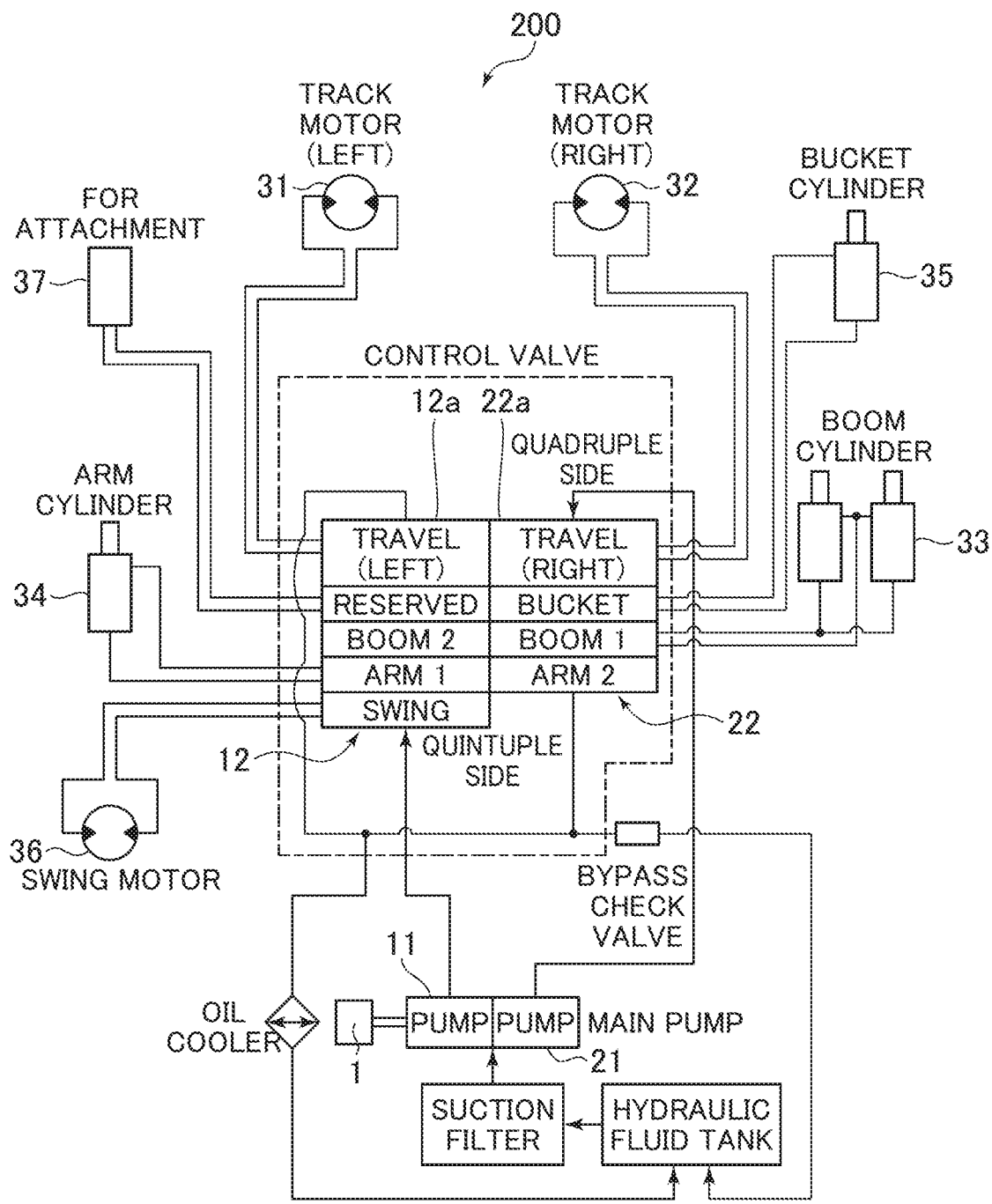
FIG. 4 is a schematic block diagram of a hydraulic drive system incorporated in the hydraulic excavator depicted in FIG. 1.

FIG. 4 is a schematic block diagram of a hydraulic drive system mounted on the hydraulic excavator 100 depicted in FIG. 1.

Referring to FIG. 4, the hydraulic drive system 200 includes: an engine 1 as a prime mover; first and second pumps 11 and 12 driven by the engine 1; a first control valve unit 12 configured from multiple directional control valves for controlling flows of hydraulic fluid between the first pump 11 and the left track motor 31, boom cylinder 33, arm cylinder 34, swing motor 36 and attachment hydraulic actuator 37; a second control valve unit 22 configured from multiple directional control valves for controlling flows of hydraulic fluid between the second pump 21 and the right track motor 32, boom cylinder 33, arm cylinder 34 and bucket cylinder 35; the left travel lever device 6 (depicted in FIG. 5) that has a left travel lever 6a for operating the left track motor 31; the right travel lever device 7 (depicted in FIG. 5) that has a right travel lever 7a for operating the right track motor 32; the left operation lever device 8 (depicted in FIG. 5) that has a left operation lever 8a for operating the arm cylinder 34 and the swing motor 36; the right operation lever device 9 (depicted in FIG. 5) that has a right operation lever 9a for operating the boom cylinder 33 and the bucket cylinder 35; a front operation detector 3 (depicted in FIG. 5) that serves as a work operation detector for detecting an operation (a front operation) of the boom cylinder 33, arm cylinder 34 and bucket cylinder 35 by an operator; a swing operation detector 4 (depicted in FIG. 5) that services as a work operation detector for detecting an operation (a swinging operation) of the swing motor 36 by the operator; a travel operation detector 5 (depicted in FIG. 5) that detects an operation (a travel operation) of the left and right track motors 31 and 32 by the operator, and a controller 2 (depicted in FIG. 5) as a control device.

Figure 5:
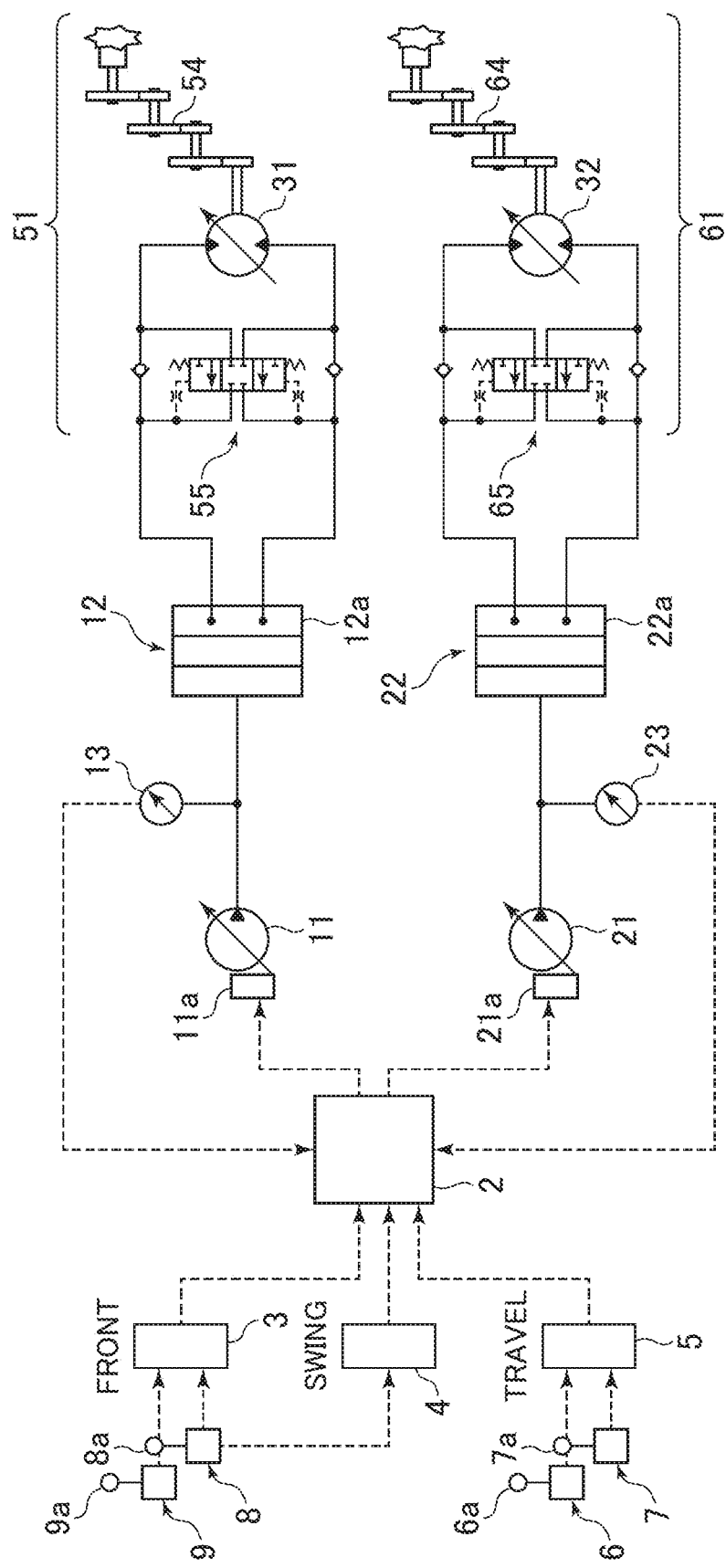
FIG. 5 is a view depicting a track drive system of the hydraulic excavator depicted in FIG. 1.

FIG. 5 is a view depicting a track drive system of the hydraulic excavator 100.

Referring to FIG. 5, the track drive system includes the first and second pumps 11 and 12; the left and right track motors 31 and 32; the left and right travel speed reducers 54 and 64 driven by the track motors 31 and 32, respectively; a left track directional control valve 12a that configures a part of the first control valve unit 12 and controls a flow of hydraulic fluid between the first pump 11 and the left track motor 31; a right track directional control valve 22a that configures a part of the second control valve unit 22 and controls a flow of hydraulic fluid between the second pump 21 and the right track motor 32; the left brake valve 55 provided in a hydraulic line that connects the left track directional control valve 12a and the left track motor 31 to each other; and the right brake valve 65 provided in a hydraulic line that connects the right track directional control valve 22a and the right track motor 32 to each other.

The first and second pumps 11 and 12 are hydraulic pumps of the variable displacement type and include pump regulators 11a and 21a for adjusting the tilt amount (the pump displacement), respectively.

The left and right track motors 31 and 32 perform speed change by changing the motor displacement (the tilt amount). The left and right travel speed reducers 54 and 64 are configured each from a multistage (for example, three-stage) planetary gear mechanism having a high speed reduction ratio in order to drive a machine body having great inertia.

The left and right brake valves 55 and 65 are counterbalance valves and prevent the left and right track motors 31 and 32 from running away by inertia torque acting upon traveling on a downhill or the like by adjusting the back-pressure of the left and right track motors 31 and 32.

In a hydraulic line that connects the first pump 11 and the first control valve unit 12 to each other, a first pressure sensor 13 as a first pressure detector is provided which converts a delivery pressure of the first pump 11 (a first pump pressure) into a pressure signal and outputs the pressure signal to the controller 2. Meanwhile, in a hydraulic line that connects the second pump 21 and the second control valve unit 22 to each other, a second pressure sensor 23 as a second pressure detector is provided which converts a delivery pressure of the second pump 21 (a second pump pressure) into a pressure signal and outputs the pressure signal to the controller 2.

The controller 2 calculates target delivery flow rates for the first and second pumps 11 and 12 on the basis of front operation signals inputted from the left and right operation lever devices 8 and 9 through the front operation detector 3, a swing operation signal inputted from the left operation lever device 8 through the swing operation detector 4 and travel operation signals inputted from the left and right travel lever devices 6 and 7 through the travel operation detector 5 and so forth, calculates tilt amounts (first and second tilt command values) on the basis of the target delivery flow rates, and outputs command signals according to the tilt command values to the pump regulators 11a and 21a. Consequently, the delivery flow rates of the first and second pumps 11 and 12 are controlled so as to coincide with the respective target delivery flow rates.

The controller 2 performs anomaly diagnosis of the left and right track devices 50 and 60 when the hydraulic excavator 100 is in a predetermined action state on the basis of the operation signals from the operation detectors 3 to 5 and the pressure values detected by the first and second pressure sensors 13 and 23 (first and second pump pressures).

Figure 6:
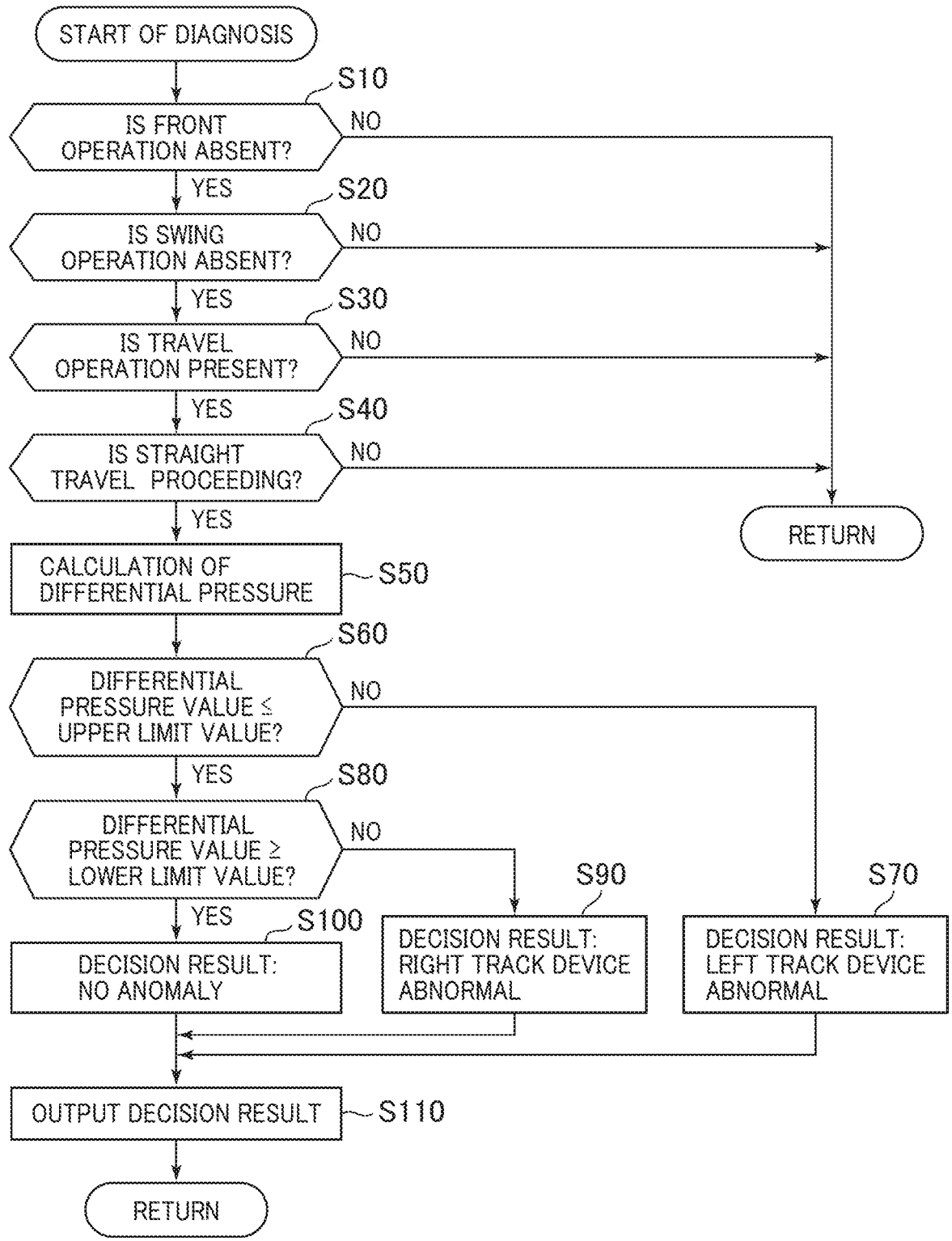
FIG. 6 is a view depicting an anomaly decision flow for left and right track devices by a controller depicted in FIG. 3.

FIG. 6 is a view depicting an anomaly decision flow for the left and right track devices 50 and 60 by the controller 2 depicted in FIG. 5. In the following, steps configuring the anomaly decision flow are described in order.

First at step S10, it is decided on the basis of the front operation signal from the front operation detector 3, whether or not a front operation is absent.

In the case where it is decided at step S10 that a front operation is absent (Yes), then it is decided on the basis of the swing operation signal from the swing operation detector 4 whether or not a swing operation is absent at step S20. On the other hand, in the case where it is decided at step S10 that a front operation is present (No), the processing returns to step S10.

In the case where it is decided at step S20 that a swing operation is absent (Yes), it is decided on the basis of the travel operation signal from the travel operation detector 5 whether or not a travel operation is present at step 30. On the other hand, in the case where it is decided at step S20 that a front operation is present (No), the processing returns to step S10.

In the case where it is decided at step S30 that a travel operation is present (Yes), it is decided on the basis of the first tilt command value and the second tilt command value whether or not the straight travel is proceeding at step S40. Here, in the case where the first tilt command value and the second tilt command value are equal to each other during a single travel operation, the flow rates supplied from the first and second pumps 11 and 12 to the left and right track motors 31 and 32 are equal to each other. At this time, the rotational speeds of the left and right track motors 31 and 32 are equal to each other, and the left and right track devices 50 and 60 travel straight. Accordingly, it can be decided whether or not straight travel is proceeding on the basis of whether or not the first tilt command value and the second tilt command value are equal to each other. In particular, taking a manufacturing error of the first and second pumps 11 and 12, left and right track motors 31 and 32 and so forth into consideration, when a difference between the first tilt command value and the second tilt command value is equal to or smaller than a predetermined threshold value, it is decided that the left and right track devices 50 and 60 are traveling straight. On the other hand, in the case where it is decided at step S30 that a travel operation is absent (No), the processing returns to step S10.

In the case where it is decided at step S40 that straight travel is proceeding (Yes), a differential pressure value obtained by subtracting the second pump pressure from the first pump pressure is calculated as an anomaly decision evaluation value (step S50). On the other hand, in the case where it is decided at step S40 that straight travel is not proceeding (No), the processing returns to step S10.

Figure 7:
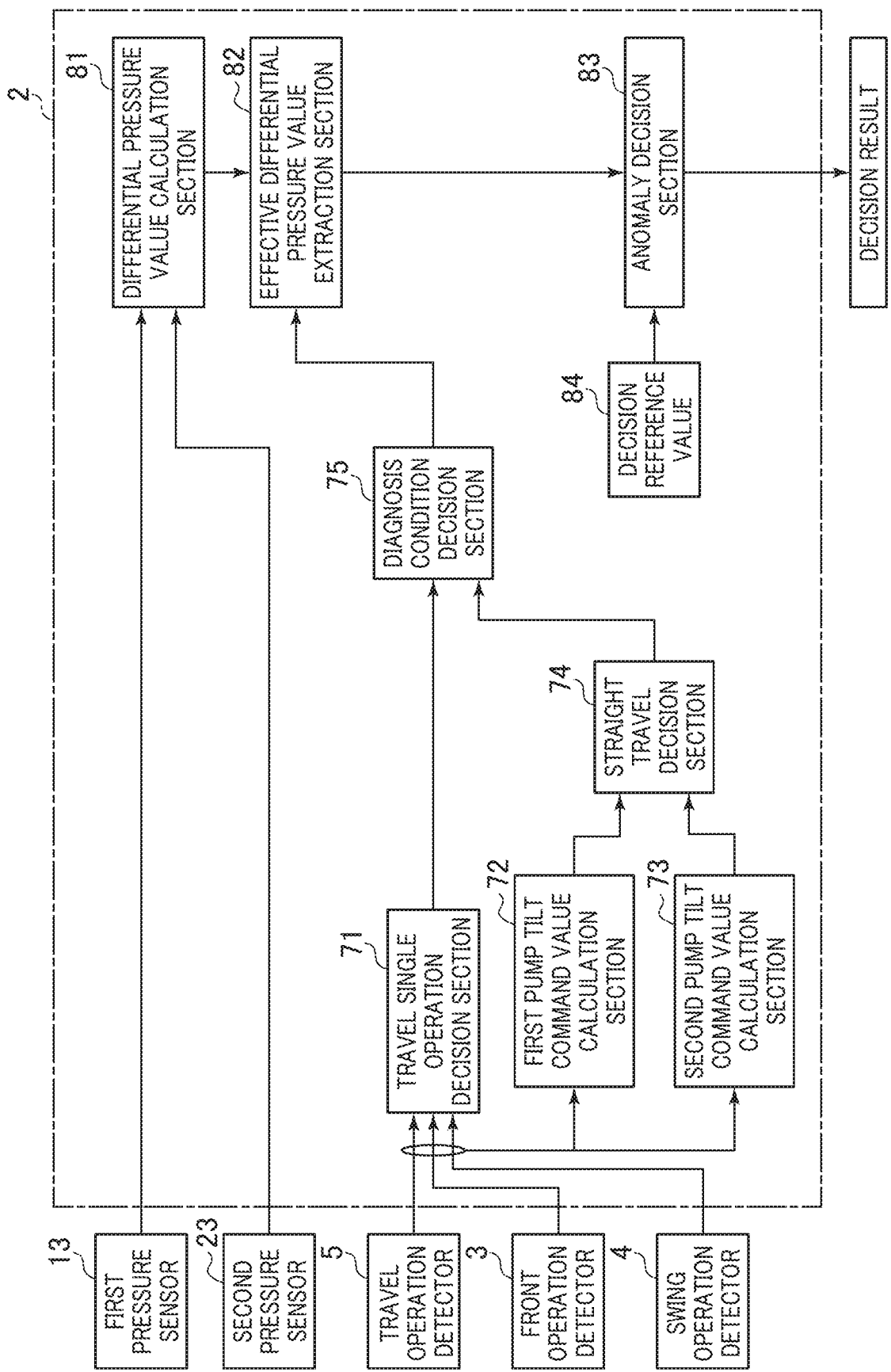
FIG. 7 is a functional block diagram of the controller depicted in FIG. 3.

At step S60 next to step S50, it is decided whether or not the differential pressure value calculated at step S50 is equal to or lower than a predetermined upper limit value. Here, as the predetermined upper limit value, a decision reference value 84 depicted in FIG. 7 is set, taking pressure detecting error, manufacturing errors of the first and second pumps 11 and 12, left and right track devices 50 and 60 and so forth into consideration. In the case where the loss torques of the left and right track devices during single travel operation and during straight travel are comparable, since the left and right track motors 31 and 32 are driven equally to each other by the first and second pumps 11 and 21, the first and second pump pressures become comparable and the differential pressure value becomes equal to or lower than the predetermined upper limit value. On the other hand, in the case where the loss torque of the left track device 50 during single travel operation and during straight travel is greater than the loss torque of the right track device 60, the first pump pressure becomes greater than the second pump pressure and the differential pressure value becomes greater than the predetermined upper limit value.

In the case where it is decided at step S60 that the differential pressure value is greater than the predetermined upper limit value (No), it is decided at step S70 that the left track device 50 has some anomaly.

In the case where it is decided at step S60 that the differential pressure value is equal to or higher than the predetermined upper limit value (Yes), it is decided at step S80 whether or not the differential pressure value is equal to or higher than a predetermined lower limit value. To the predetermined lower limit value, a value obtained by setting the sign of the decision reference value 84 depicted in FIG. 7 to minus is set. In the case where the loss torques of the left and right track motors 50 and 60 during single travel operation and besides during straight travel are comparable, since the left and right track motors 31 and 32 are driven equally by the first and second pumps 11 and 12, the first and second pump pressures become substantially equal to each other, and the differential pressure value becomes equal to or higher than the predetermined lower limit value. On the other hand, in the case where the loss torque of the right track device 60 during single travel operation and besides during straight travel is higher than the loss torque of the left track device 50, the second pump pressure becomes higher than the first pump pressure and the differential value becomes smaller than the predetermined lower limit value.

In the case where it is decided at step S80 that the differential pressure value is lower than the predetermined lower limit value (No), it is decided at step S90 that the right track device 60 has some anomaly. On the other hand, in the case where it is decided at step S80 that the differential pressure value is equal to or higher than the predetermined lower limit value (Yes), it is decided at step S100 that the left and right track devices 50 and 60 have no anomaly.

At step S110 next to step S70, S90 or S100, a decision result at step S70, S90 or S100 is conveyed to the operator through a monitor or the like disposed in the operation room 110, or is conveyed to a machine manager, service staff or the like by communication or the like, whereafter the processing returns to step S10.

FIG. 7 is a functional block diagram of the controller 2 depicted in FIG. 3.

Referring to FIG. 7, the controller 2 includes a travel single operation decision section 71, a first pump tilt command value calculation section 72, a second pump tilt command value calculation section 73, a straight travel decision section 74, a diagnosis condition decision section 75, a differential pressure value calculation section 81, an effective differential pressure value extraction section 82, an anomaly decision section 83 and the decision reference value 84.

The travel single operation decision section 71 decides whether or not single travel operation is being performed on the basis of a travel operation signal from the travel operation detector 5, a front operation signal from the front operation detector 3 and a swing operation signal from the swing operation detector 4, and outputs a result of the decision to the diagnosis condition decision section 75. The diagnosis condition decision section 75 corresponds to steps S10, S20 and S30 depicted in FIG. 6.

The first pump tilt command value calculation section 72 calculates a tilt command value for the first pump 21 (a first tilt command value) on the basis of a travel operation signal from the travel operation detector 5, a front operation signal from the front operation detector 3 and a swing operation signal from the swing operation detector 4, and outputs the first tilt command value to the straight travel decision section 74. Similarly, the second pump tilt command value calculation section 73 calculates a tilt command value for the second pump 21 (a second tilt command value) on the basis of a travel operation signal from the travel operation detector 5, a front operation signal from the front operation detector 3 and a swing operation signal from the swing operation detector 4, and outputs the second tilt command value to the straight travel decision section 74. It is to be noted that the first and second pump tilt command value calculation sections 72 and 73 are part of control logics for machine body control, and although it is general to adopt positive control of increasing the pump flow rate in response to the operation amount of the left and right travel levers 6a and 7a (depicted in FIG. 5) and the left and right operation levers 8a and 9a (depicted in FIG. 5), the present invention is not limited to this.

The straight travel decision section 74 decides whether or not straight travel is proceeding on the basis of a first tilt command value from the first pump tilt command value calculation section 72 and a second tilt command value from the second pump tilt command value calculation section 73, and outputs a result of the decision to the diagnosis condition decision section 75. In particular, when a difference between the first tilt command value and the second tilt command value is equal to or smaller than a predetermined threshold value, it is determined that straight travel is proceeding, but when a difference between the first tilt command value and the second tilt command value is greater than the predetermined threshold value, it is decided that straight travel is not proceeding. The straight travel decision section 74 corresponds to step S40 depicted in FIG. 6.

The diagnosis condition decision section 75 decides whether or not single travel operation is proceeding and besides straight travel is proceeding on the basis of a result of the decision from the travel single operation decision section 71 and a result of the decision from the straight travel decision section 74 and outputs a result of the decision to the effective differential pressure value extraction section 82. The diagnosis condition decision section 75 corresponds to steps S10, S20, S30 and S40 depicted in FIG. 6.

The differential pressure value calculation section 81 subtracts a pressure value from the second pressure sensor 23 (a second pump pressure value) from a pressure value from the first pressure sensor 13 (a first pump pressure) to calculate a differential pressure value and supplies the differential pressure value to the effective differential pressure value extraction section 82.

The effective differential pressure value extraction section 82 outputs a differential pressure value from the differential pressure value calculation section 81 to the anomaly decision section 83 in the case where a decision result from the diagnosis condition decision section 75 is effective (in the case where single travel operation is proceeding and besides straight travel is proceeding), but outputs zero as the differential pressure value in the case where the decision result from the diagnosis condition decision section 75 is ineffective (in the case where composite travel operation is not proceeding or straight travel is not proceeding). The effective differential pressure value extraction section 82 and the differential pressure value calculation section 81 correspond to step S50 depicted in FIG. 6.

The anomaly decision section 83 decides whether or not one of the left and right track devices 50 and 60 has some anomaly on the basis of a result of comparison between a differential pressure value from the effective differential pressure value extraction section 82 and the decision reference value 84 and outputs a result of the decision. Here, the decision reference value 84 is a value determined empirically, and it is necessary to suitably correct the decision reference value 84. Therefore, the controller 2 is preferably configured such that the decision reference value 84 can be changed from the outside. The decision result of the anomaly decision section 83 is output to a display device, wireless communication device, and the like. This makes it possible for an operator, a machine manager or service staff to rapidly grasp an anomaly. The anomaly decision section 83 corresponds to steps S60, S70, S80, S90, S100 and S110 depicted in FIG. 6.

An anomaly decision action for the left and right track devices 50 and 60 in the hydraulic excavator 100 configured in such a manner as described is described with reference to FIG. 6 separately in regard to those upon working, upon steering travel and upon straight travel.

Upon Working

Upon working, since a front operation or a swing operation is performed, the decision result of the travel single operation decision section 71 is false and also the decision result of the diagnosis condition decision section 75 is false. Consequently, since the differential pressure value calculated by the differential pressure value calculation section 81 is not extracted by the effective differential pressure value extraction section 82, anomaly detection for the left and right track devices 50 and 60 by the anomaly decision section 83 is not performed. Consequently, upon working in which the front work implement 103 or the upper swing structure 102 is driven, the left and right track devices 50 and 60 can be prevented from being decided abnormal in error.

Upon Steering Travel

Upon steering travel, since only a travel operation is detected, the decision result by the travel single operation decision section 71 is true. On the other hand, upon steering traveling, since the difference between the first pump tilt command value and the second pump tilt command value is great, the decision result of the straight travel decision section 74 is false and also the decision result of the diagnosis condition decision section 75 is false. Consequently, since the differential pressure value calculated by the differential pressure value calculation section 81 is not extracted by the effective differential pressure value extraction section 82, anomaly detection for the left and right track devices 50 and 60 by the anomaly decision section 83 is not performed. As a result, upon travel in which the left and right track devices 50 and 60 are not driven equally, the left and right track devices 50 and 60 can be prevented from being decided abnormal in error.

Upon Straight Travel

Upon straight travel, since only a travel operation is detected, the decision result of the travel single operation decision section 71 is true. Further, upon straight travel, since the first pump tilt command value and the second pump tilt command value are comparable, the decision result of the straight travel decision section 74 is true and also the decision result of the diagnosis condition decision section 75 is true. Consequently, since the differential pressure value calculated by the differential pressure value calculation section 81 is extracted by the effective differential pressure value extraction section 82, anomaly decision for the left and right track devices 50 and 60 is performed by the anomaly decision section 83.

Here, in the case where the loss torques by sliding resistance and so forth of the left and right track devices 50 and 60 are comparable, the first pump pressure and the second pump pressure are comparable, and the differential pressure value is equal to or lower than the predetermined upper limit value and is equal to or higher than the predetermined limit value. Therefore, it is decided by the anomaly decision section 83 that the left and right track devices 50 and 60 have no anomaly.

On the other hand, in the case where the loss torque of the left track device 50 is higher than that of the right track device 60, the first pump pressure is higher than the second pump pressure and the differential pressure value is higher than the predetermined upper limit value. Therefore, it is decided by the anomaly decision section 83 that the left track device 50 has some anomaly. On the other hand, in the case where the loss torque of the right track device 60 is higher than that of the left track device 50, the second pump pressure is higher than the first pump pressure and the differential pressure value is lower than the predetermined lower limit value. Therefore, it is decided by the anomaly decision section 83 that the right track device 60 has some anomaly. A result of the decision of the anomaly decision section 83 is conveyed to the operator through the monitor or the like disposed in the operation room 110, or is conveyed to the machine manager utilizing communication or the like. Consequently, the operator or the machine manager can quickly carry out repair support.

According to the present embodiment configured in such a manner as described above, during single travel operation and besides during straight travel (when both of the left and right track devices 50 and 60 are driven equally by the first and second pumps 11 and 12), by subtracting one of the first and second pump pressures from the other to calculate a differential pressure value as an anomaly decision evaluation value and comparing this anomaly decision evaluation value with the decision reference value 84, an anomaly of one of the left and right track devices 50 and 60 can be detected.

Further, by subtracting one of the first and second pump pressures from the other to calculate a differential pressure value as an anomaly decision evaluation value, the influences of a change of the hydraulic fluid temperature, time-dependent deterioration of the left and right track devices 50 and 60 and so forth on the first and second pump pressures cancel each other, and therefore, the accuracy in anomaly detection of the left and right track devices 50 and 60 can be improved.

Second Embodiment

A hydraulic excavator according to a second embodiment of the present invention is described principally in regard to differences from the first embodiment.

Generally, upon speeding up of the left and right track devices 50 and 60, since the first and second pump pressures fluctuate by a great amount, even the left and right track devices 50 and 60 are normal and besides the tilt command values for the first and second pumps 11 and 12 are comparable, the differential pressure between the first pump pressure and the second pump pressure sometimes becomes great by a gap between operation timings of the left and right travel levers 6a and 7a, a difference in responsiveness between the first and second pumps 11 and 12 and so forth.

Here, in the first embodiment, during single travel operation and besides during straight travel (when both of the tilt command values for the first and second pumps 11 and 21 are comparable), anomaly decision for the left and right track devices 50 and 60 is performed on the basis of the first pump pressure and the second pump pressure both upon stationary travel and upon speeding up. Therefore, there is the possibility that, upon speeding up, an anomaly of the left and right track devices 50 and 60 may be detected in error. The present embodiment is configured such that, in a transient travel state upon speeding up or the like, the anomaly decision accuracy for the left and right track devices 50 and 60 can be maintained.

Figure 8:
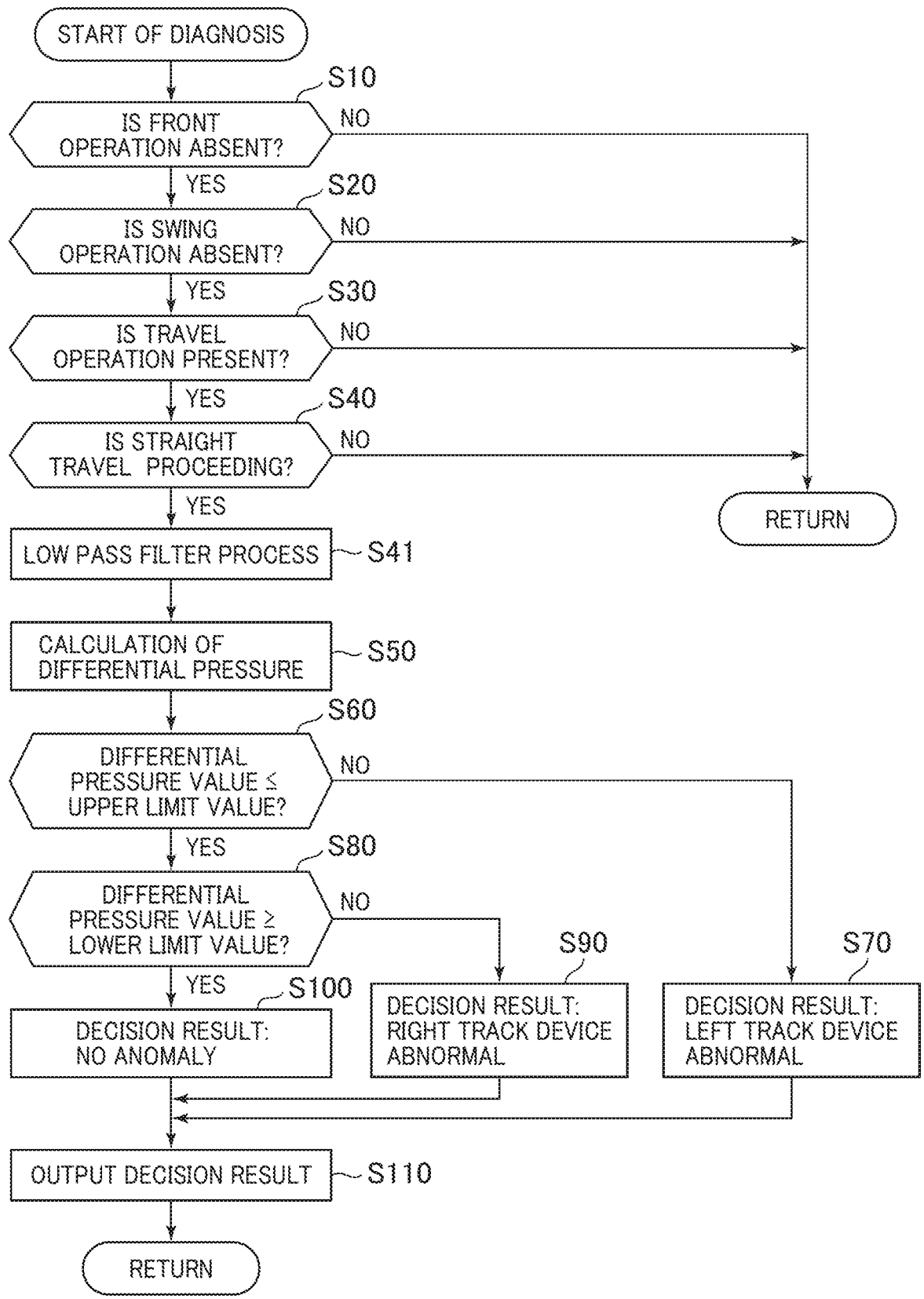
FIG. 8 is a view depicting an anomaly decision flow for the left and right track devices by the controller according to a second embodiment.

FIG. 8 is a view depicting an anomaly decision flow for the left and right track devices 50 and 60 by the controller 2 according to the present embodiment. In the following, differences from the control flow according to the first embodiment depicted in FIG. 6 are described.

Referring to FIG. 8, in the case where it is decided at step S40 that straight travel is proceeding (Yes), a low-pass filter process is performed for the first and second pump pressures at step S41. Here, the low-pass filter process is for removing pressure fluctuations of the first and second pump pressures that occur upon speeding up of the left and right track devices 50 and 60, and a moving average process can be listed as an example.

Figure 9:
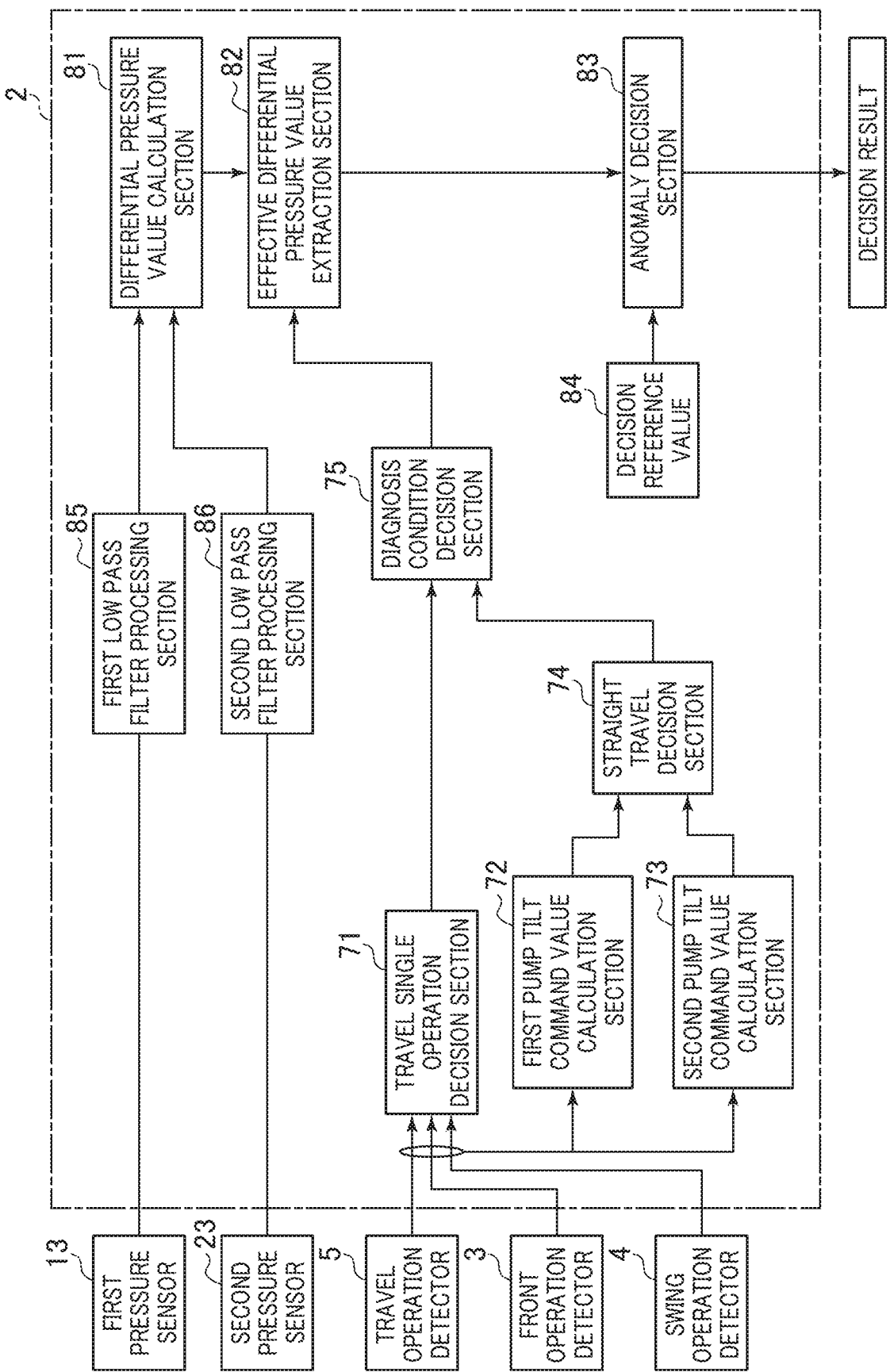
FIG. 9 is a functional block diagram of the controller according to the second embodiment.

FIG. 9 is a functional block diagram of the controller 2 according to the present embodiment. In the following, differences from the functional block diagram (depicted in FIG. 7) according to the first example are described.

Referring to FIG. 9, the controller 2 further includes first and second low pass filter processing sections 85 and 86.

The first low pass filter processing section 85 performs a low pass filter process for a pressure value from the first pressure sensor 13 (for a first pump pressure). Similarly, the second low pass filter processing section 86 performs a low pass filter process for a pressure value from the second pressure sensor 23 (for a second pump pressure). Consequently, a transient fluctuation component of each pressure value is removed and a trend component of each pressure value is extracted. The first and second low pass filter processing sections 85 and 86 correspond to step S41 depicted in FIG. 8.

Figure 10:
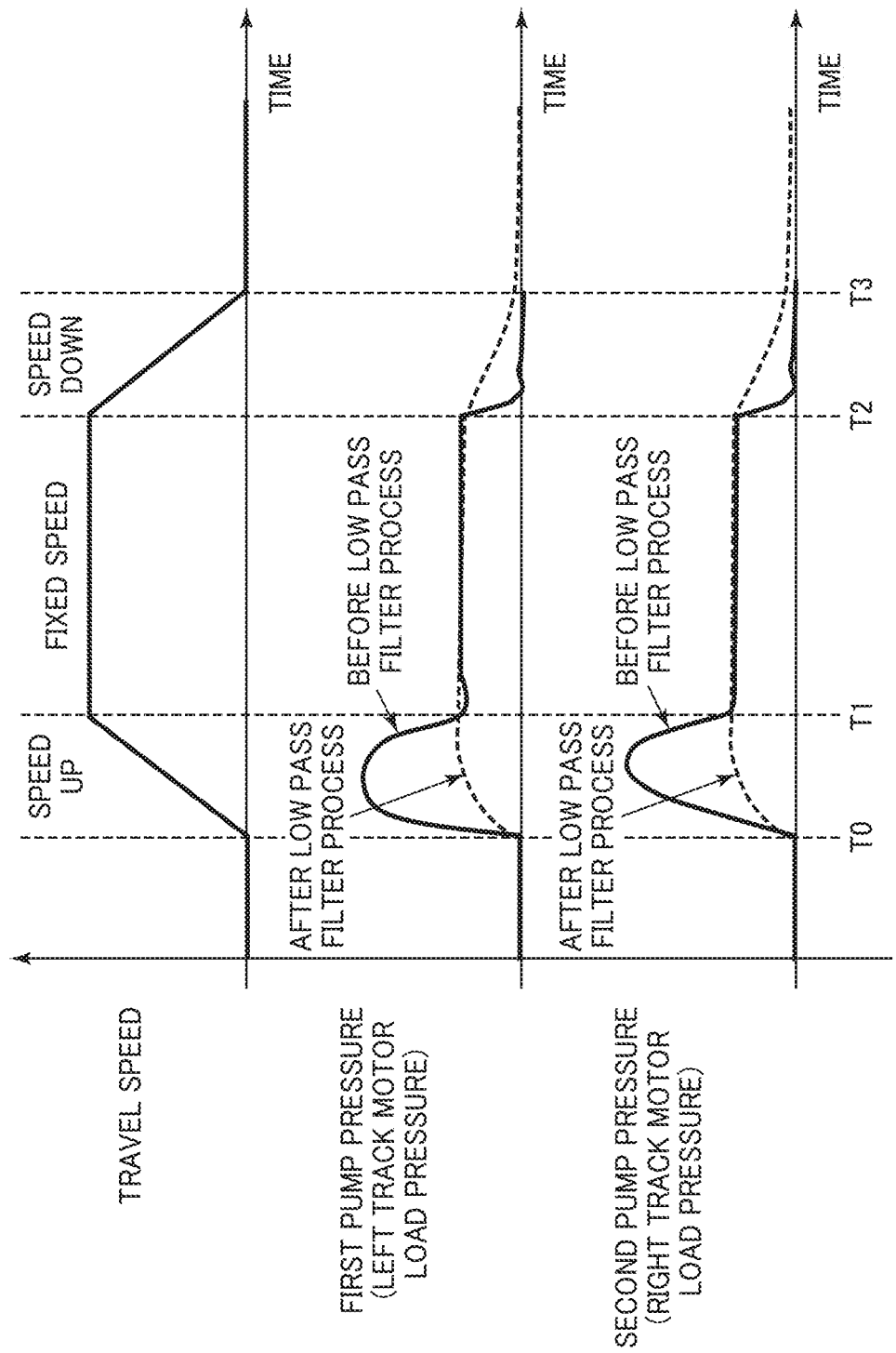
FIG. 10 is a view depicting an example of a time-dependent change of a travel speed, a first pump pressure (left track motor load pressure) and a second pump pressure (right track motor load pressure) in the case where loss torques of the left and right track devices in the hydraulic excavator according to the second embodiment are comparable.

FIG. 10 is a view depicting an example of a time-dependent change of the first pump pressure (the leftward track motor load pressure) and the second pump pressure (the right track motor load pressure) in the case where the loss torques of the left and right track devices 50 and 60 are comparable in the hydraulic excavator 100 according to the present embodiment.

Referring to FIG. 10, upon speeding up (from time T0 to time T1) of the left and right track devices 50 and 60, the first and second pump pressures (indicated by solid lines in FIG. 10) fluctuate much. Therefore, even in the left and right track devices 50 and 60 are normal and besides the tilt command values for the first and second pumps 11 and 12 are comparable, the differential pressure between the first pump pressure and the second pump pressure sometimes becomes great by a gap between operation timings of the left and right travel levers 6a and 7a, a difference in responsiveness between the first and second pumps 11 and 12 and so forth.

In contrast, in the first and second pump pressures after the low pass filter process (indicated by broken lines in FIG. 10), transient fluctuations are leveled, and therefore, the differential pressure between the first pump pressure and the second pump pressure decreases. Accordingly, by calculating the differential pressure value between the first pump pressure and the second pump pressure after the low pass filter process as an anomaly decision evaluation value, an anomaly of any of the left and right track devices 50 and 60 upon speeding up in travel can be prevented from being detected in error.

Also with the present embodiment configured in such a manner as described above, similar advantages to those of the first embodiment can be achieved.

Further, by carrying out a low pass filter process for each of the pressure values from the first and second pressure sensors 13 and 23, namely, for each of the first and second pump pressure values, a transient fluctuation component included in each pressure value, namely, in each of the first and second pump pressure values, is removed. Consequently, in a transient travel state upon speeding up or the like, the anomaly decision accuracy of the left and right track devices 50 and 60 can be maintained.

Third Embodiment

A hydraulic excavator according to a third embodiment of the present invention is described principally in regard to differences from the second embodiment.

Generally, the site (ground) at which a work machine such as a hydraulic excavator is used is off-road and is not uniform in shape of the road surface, geological features, hardness and so forth, and therefore, the road surface state is sometimes different between the left and the right of the machine body. According to the track drive system (depicted in FIG. 5) according to the first embodiment, by controlling the delivery flow rates of the first and second pumps equally, the hydraulic excavator can travel without meandering even in the case where the road surface state is different on the left and the right of the machine body. Here, in the case where the road surface condition is different between the left and the right of the machine body, since the left-light difference occurs with the track drive load due to travel resistance or the like, even if the loss torques of the left and right track devices 50 and 60 during single travel operation and besides during straight travel are comparable, the differential pressure between the first pump pressure and the second pump pressure sometimes becomes great.

In contrast, in the first and second embodiments during single travel operation and straight travel, anomaly decision of the left and right track devices 50 and 60 is performed on the basis of the differential pressure between the first pump pressure and the second pump pressure regardless of the road surface situation. Therefore, in the case where a left-right difference occurs with the track drive load depending upon the road surface situation, there is the possibility that an anomaly of the left and right track devices 50 and 60 may be detected in error. The present embodiment makes it possible to detect an anomaly of the left and right track devices 50 and 60 without being influenced by the road surface situation.

Figure 11:
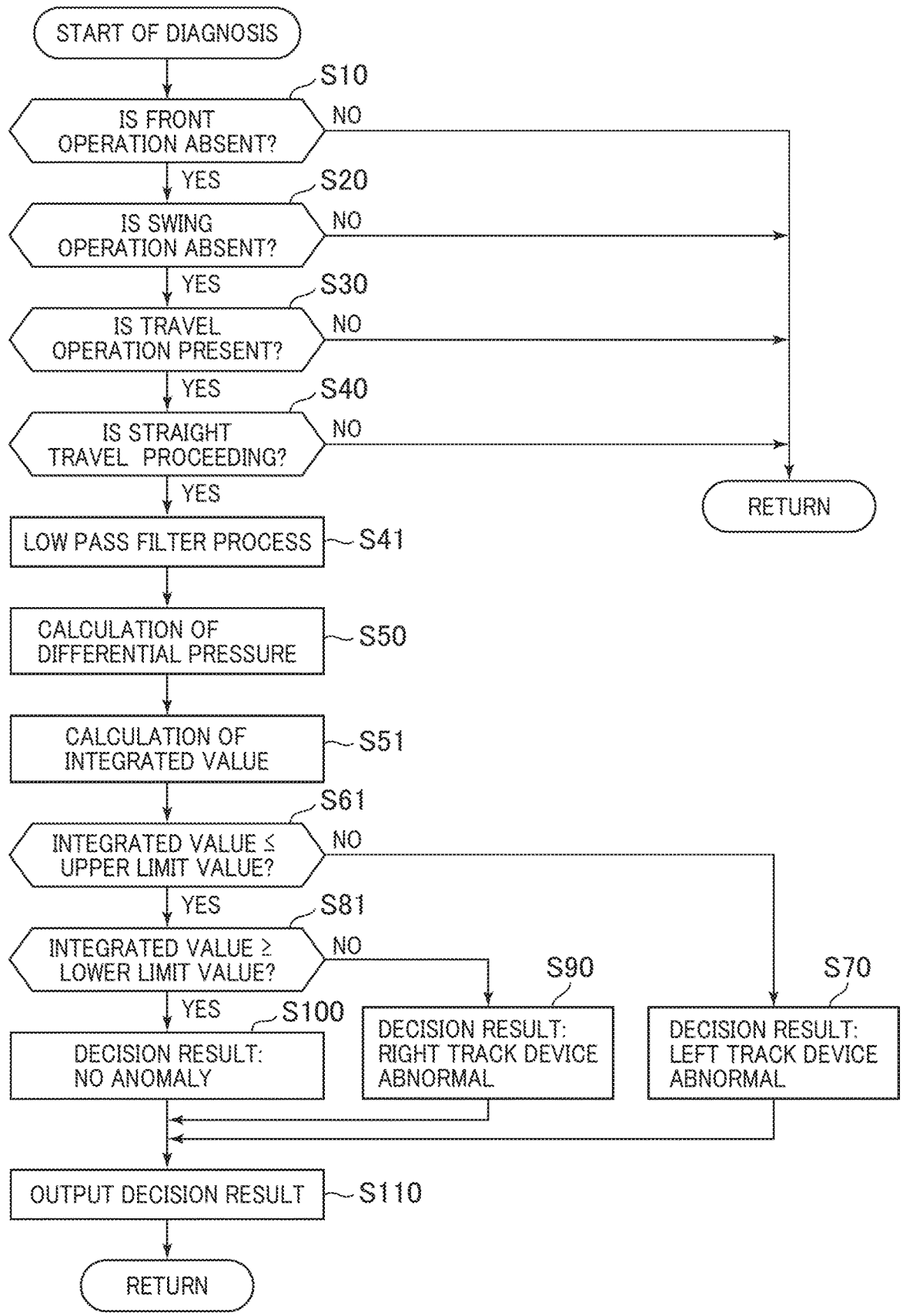
FIG. 11 is a view depicting an anomaly decision flow for the left and right track devices by the controller according to a third embodiment.

FIG. 11 is a view depicting an anomaly decision flow for the left and right track devices 50 and 60 by the controller 2 according to the present embodiment. In the following, differences from the control flow (depicted in FIG. 8) according to the second embodiment are described.

Referring to FIG. 11, after the pressure difference value is calculated by subtracting the second pump pressure from the first pump pressure at step S50, an integrated value of the differential pressure value (a differential pressure integrated value) is calculated as an anomaly decision evaluation value at step S51. Here, the differential pressure integrated value is a total value of a fixed number of differential pressure values calculated lately in the past at step S3.

Figure 12:
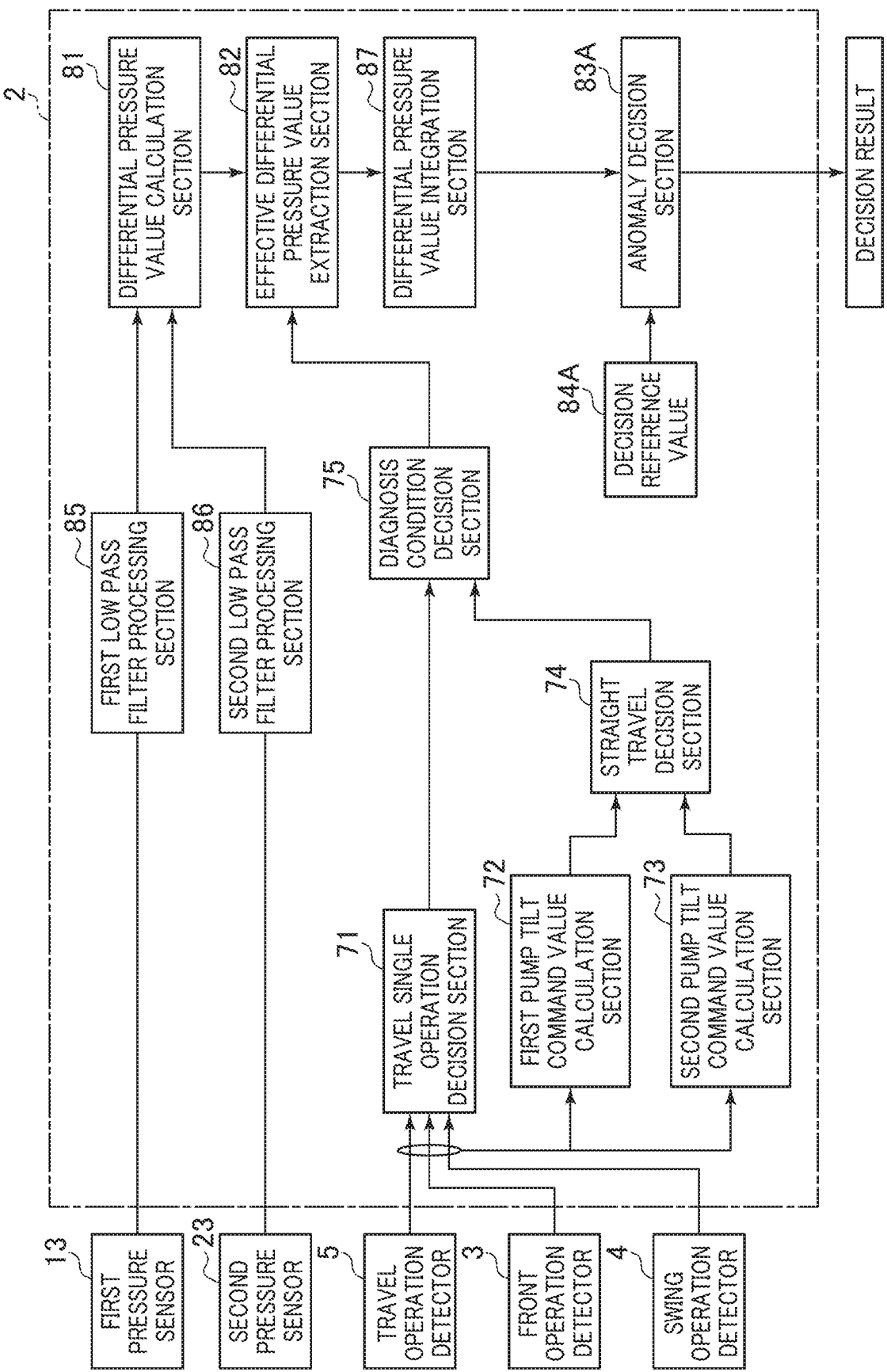
FIG. 12 is a functional block diagram of the controller according to the third embodiment.
Figure 13A:
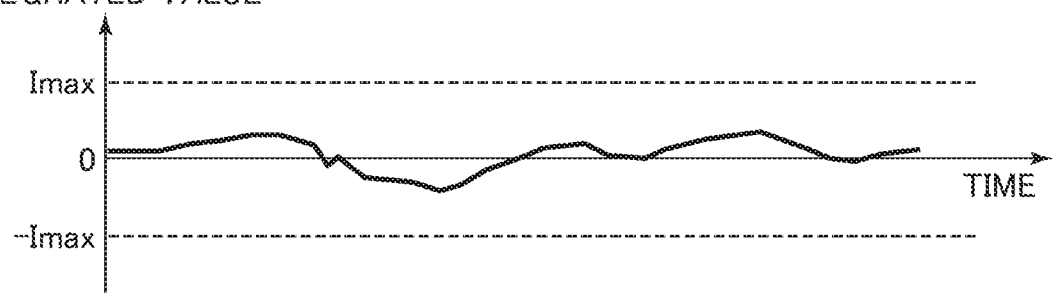
FIG. 13A is a view depicting an example of a time-dependent change of a differential pressure integrated value in the case where loss torques of the left and right track devices are comparable in the hydraulic excavator according to the third embodiment.
Figure 13B:
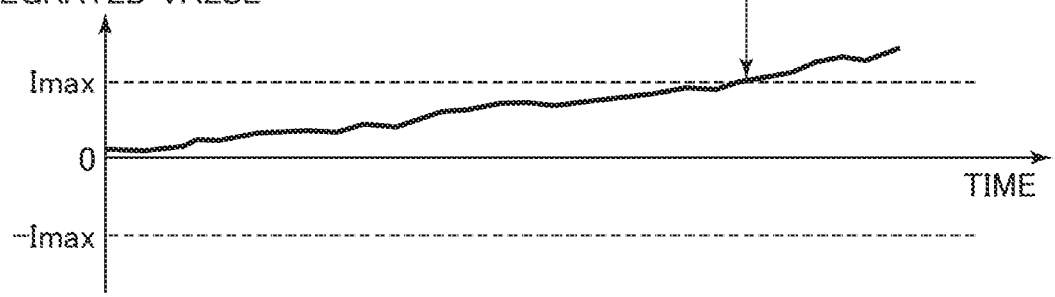
FIG. 13B is a view depicting an example of a time-dependent change of the differential pressure integrated value in the case where the loss torque of the left track device is greater in the hydraulic excavator according to the third embodiment.

At step S61, the integrated value calculated at step S61 is equal to or lower than a predetermined upper limit value Imax (depicted in FIGS. 13A and 13B). Here, to the predetermined upper limit value Imax, a decision reference value 84A (depicted in FIG. 12) is set. To the decision reference value 84A, a value obtained, for example, by multiplying the decision reference value 84 (depicted in FIG. 7) in the first embodiment by the fixed number at step S3 is set.

In the case where it is decided at step S61 that the integrated value is higher than the predetermined upper limit value (No), processes beginning with step S70 are executed.

In the case where it is decided at step S61 that the integrated value is equal to or lower than the predetermined upper limit value (Yes), it is decided at step S81 that the integrated value is equal to or higher than a predetermined lower limit value Imin. Here, to the predetermined lower limit value Imin, a value obtained by changing the sign of the decision reference value 84A (depicted in FIG. 12) to negative is set.

In the case where it is decided at step S81 that the integrated value is lower than the predetermined lower limit value (No), processes beginning with step S90 are executed. On the other hand, in the case where it is decided at step S81 that the integrated value is equal to or higher than the predetermined lower limit value (Yes), processes beginning with step S100 are executed.

FIG. 12 is a functional block diagram of the controller 2 according to the present embodiment. In the following, differences from the functional block diagram (depicted in FIG. 9) according to the second embodiment are described.

Referring to FIG. 12, the controller 2 according to the present embodiment further includes a differential pressure value integration section 87 and includes an anomaly decision section 83A in place of the anomaly decision section 83 (depicted in FIG. 9).

The differential pressure value integration section 87 calculates an integrated value of the differential pressure value from the effective differential pressure value extraction section 82 and outputs the integrated value to the anomaly decision section 83A. The differential pressure value integration section 87 corresponds to step S51 depicted in FIG. 11.

The anomaly decision section 83A performs anomaly decision of the left and right track devices 50 and 60 on the basis of the integrated value from the differential pressure value integration section 87 and the decision reference value 84A and outputs a result of the decision. The anomaly decision section 83A corresponds to steps S61, S81, S70, S90, S100 and S110 depicted in FIG. 11.

FIG. 13A is a view depicting an example of a time-dependent change of the differential pressure integrated value in the case where the loss torques of the left and right track devices 50 and 60 are comparable, and FIG. 13B is a view depicting an example of a time-dependent change of the differential pressure integrated value in the case where the loss torque of the left track device 50 is higher.

Also in the case where the loss torques of the left and right track devices 50 and 60 are comparable, the differential pressure value at each instant fluctuates greatly depending upon the road surface situation and depending upon the left-right difference. However, in a comparatively long period, it is supposed that a case in which the drive load of the left track device 50 is higher and another case in which the drive load of the right track device 60 is higher occur in equal frequencies. Accordingly, a positive differential pressure value at when the drive load of the left track device 50 is higher and a negative differential pressure value at when the drive load of the right track device 60 is higher cancel each other, and consequently, the differential pressure integrated value fluctuates within a fixed range centered at zero as indicated by FIG. 13A. Accordingly, when the differential pressure integrated value is equal to or lower than the predetermined upper limit value Imax and besides is equal to or higher than the predetermined lower limit value Imin, it can be decided that the left and right track devices 50 and 60 are normal.

On the other hand, if the left track device 50 has some anomaly, the frequency in which a positive differential pressure value is calculated becomes higher than the frequency in which a negative differential pressure value is calculated, and therefore, the differential pressure integrated value has a fixed increasing tendency and becomes higher than the predetermined upper limit value Imax at a certain point of time as depicted in FIG. 13B. Accordingly, in the case where the differential pressure integrated value is higher than the predetermined upper limit value Imax, it can be decided that the left track device 50 has some anomaly. Similarly, in the case where the differential pressure integrated value is lower than the predetermined lower limit value Imin, it can be decided that the right track device 60 has some anomaly.

Also in the present embodiment configured in such a manner as described above, similar advantages to those of the second embodiment can be achieved.

Further, by calculating the differential pressure integrated value as an anomaly decision evaluation value, an anomaly of the left and right track devices 50 and 60 can be detected eliminating the influence of the road surface state.

Fourth Embodiment

A hydraulic excavator according to a fourth embodiment of the present invention is described principally in regard to differences from the third embodiment.

In the track drive system depicted in FIG. 5, upon travel on the flat ground or an uphill, the left and right track motors 31 and 32 are driven by the first and second pumps, and therefore, the first and second pump pressures become a high pressure necessary for driving of the left and right track devices 50 and 60. On the other hand, upon travel on a downhill, the left and right track devices 50 and 60 are driven by the potential energy of the machine body, and the left and right track motors 31 and 32 perform regenerative operation. At this time, the first and second pumps 11 and 12 deliver a flow rate for suppressing cavitation of the left and right track motors 31 and 32, and the first and second pump pressures become a low pressure of such a degree that the left and right track devices 50 and 60 can be operated.

In the first to third embodiments, during single travel operation and besides during straight travel, anomaly decision for the left and right track devices 50 and 60 is performed on the basis of the differential pressure value between the first pump pressure and the second pump pressure regardless of whether the left and right track devices 31 and 32 are in a power travel state or in a regenerative operation state. However, upon regenerative action of the left and right track motors 31 and 32, since the first and second pumps 11 and 12 do not drive the left and right track motors 31 and 32, it is not appropriate to perform anomaly detection of the left and right track devices 50 and 60 on the basis of the first and second pump pressures. The present embodiment improves the anomaly decision accuracy by restricting the travel action, in which anomaly diagnosis of the left and right track devices 50 and 60 is performed, only to that upon power travel of the left and right track motors 31 and 32.

Figure 14:
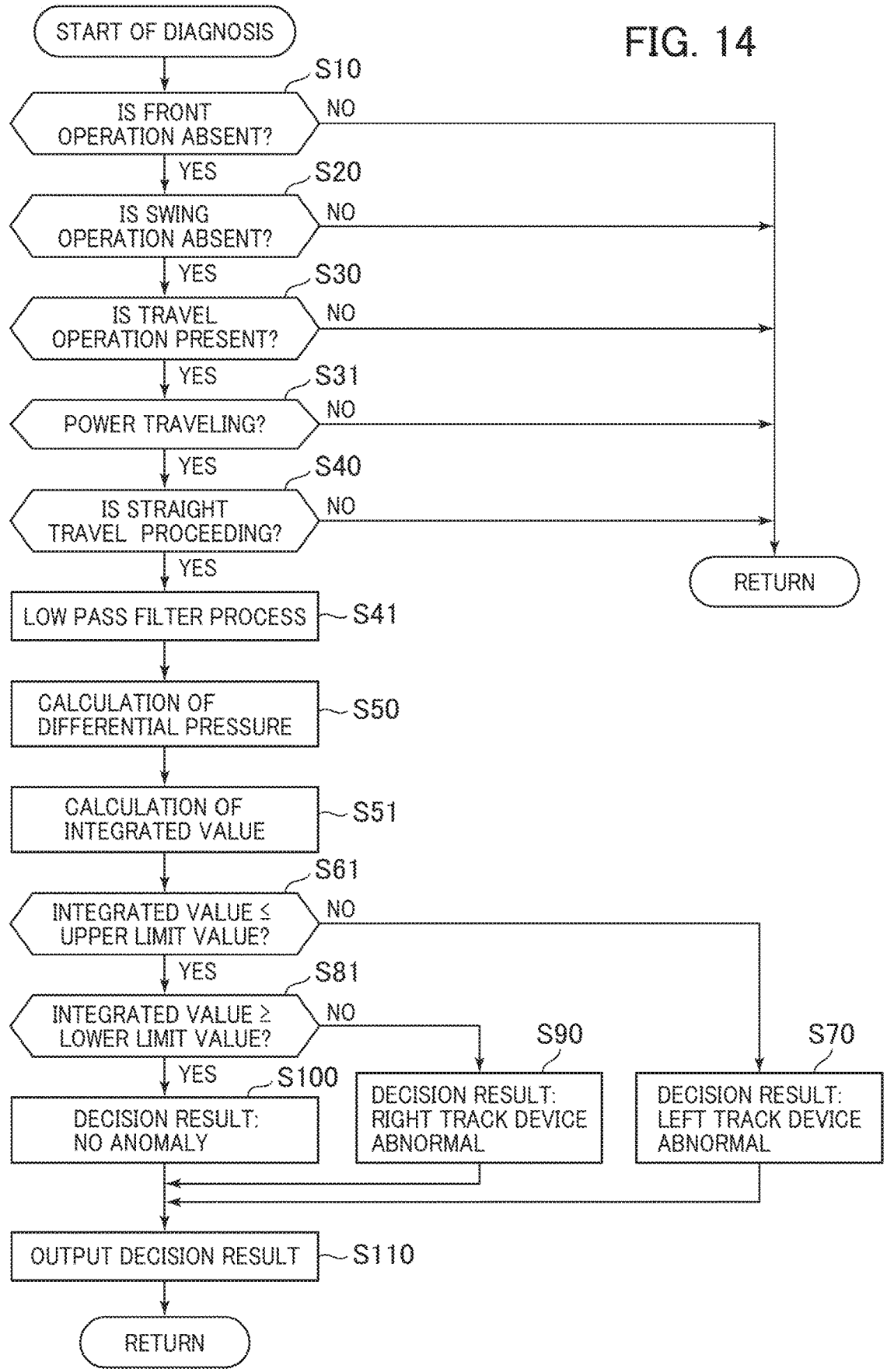
FIG. 14 is a view depicting an anomaly decision flow for the left and right travel devices by the controller according to a fourth embodiment.

FIG. 14 is a view depicting an anomaly decision flow for the left and right track devices 50 and 60 by the controller 2 according to the fourth embodiment. In the following, differences from the third embodiment (depicted in FIG. 11) are described.

Referring to FIG. 14, in the case where it is decided at step S30 that a travel operation is present (Yes), it is decided at step S31 whether or not the left and right track motors 31 and 32 are in a power travel state. In particular, in the case where the first pump pressure or the second pump pressure is higher than a predetermined threshold value Pc (depicted in FIG. 15), which is hereinafter described, it is decided that the left and right track motors 31 and 32 are in a power travel state (Yes), but in the case where the first pump pressure and the second pump pressure are equal to or lower than the predetermined threshold value Pc, it is decided that the left and right track motors 31 and 32 are not in a power travel state (No).

In the case where it is decided at step S31 that the left and right track motors 31 and 32 are in a power travel state (Yes), processes beginning with step S40 are executed. On the other hand, in the case where it is decided at step S31 that the left and right track motors 31 and 32 are not in a power travel state (No), the processing returns to step S10. Consequently, during regenerative operation of the left and right track motors 31 and 32, anomaly decision of the left and right track devices 50 and 60 is not performed.

Figure 15:
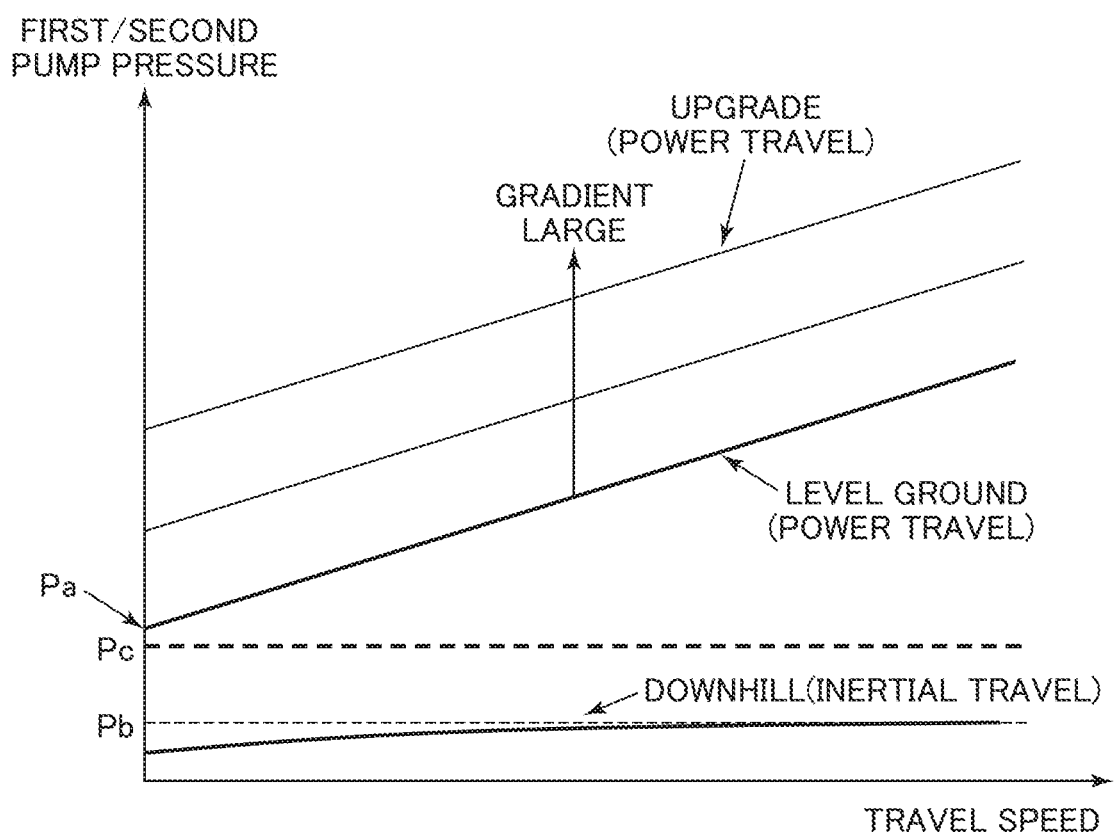
FIG. 15 is a view depicting a relationship between the travel speed and the first and second pump pressures of the hydraulic excavator depicted in FIG. 1.

FIG. 15 is a view depicting a relationship between the travel speed of the hydraulic excavator 100 depicted in FIG. 1 and the first and second pump pressures.

Referring to FIG. 15, upon travel on the flat ground to an uphill, the first and second pump pressures increase in response to the travel speed and the slope. On the other hand, upon travel on a downhill, since the left and right track motors 31 and 32 are driven for regeneration, the first and second pump pressures are such low pressures that they can operate the left and right brake valves 55 and 65 (depicted in FIG. 5). Here, since a minimum pump pressure Pmin upon travel on the ground is higher than the maximum pump pressure upon travel on a downhill, it is sufficient to set the threshold value Pc for deciding whether or not power travel is being performed to a value between a minimum pump pressure Pa upon power travel and a maximum pump pressure Pb upon regeneration.

Figure 16:
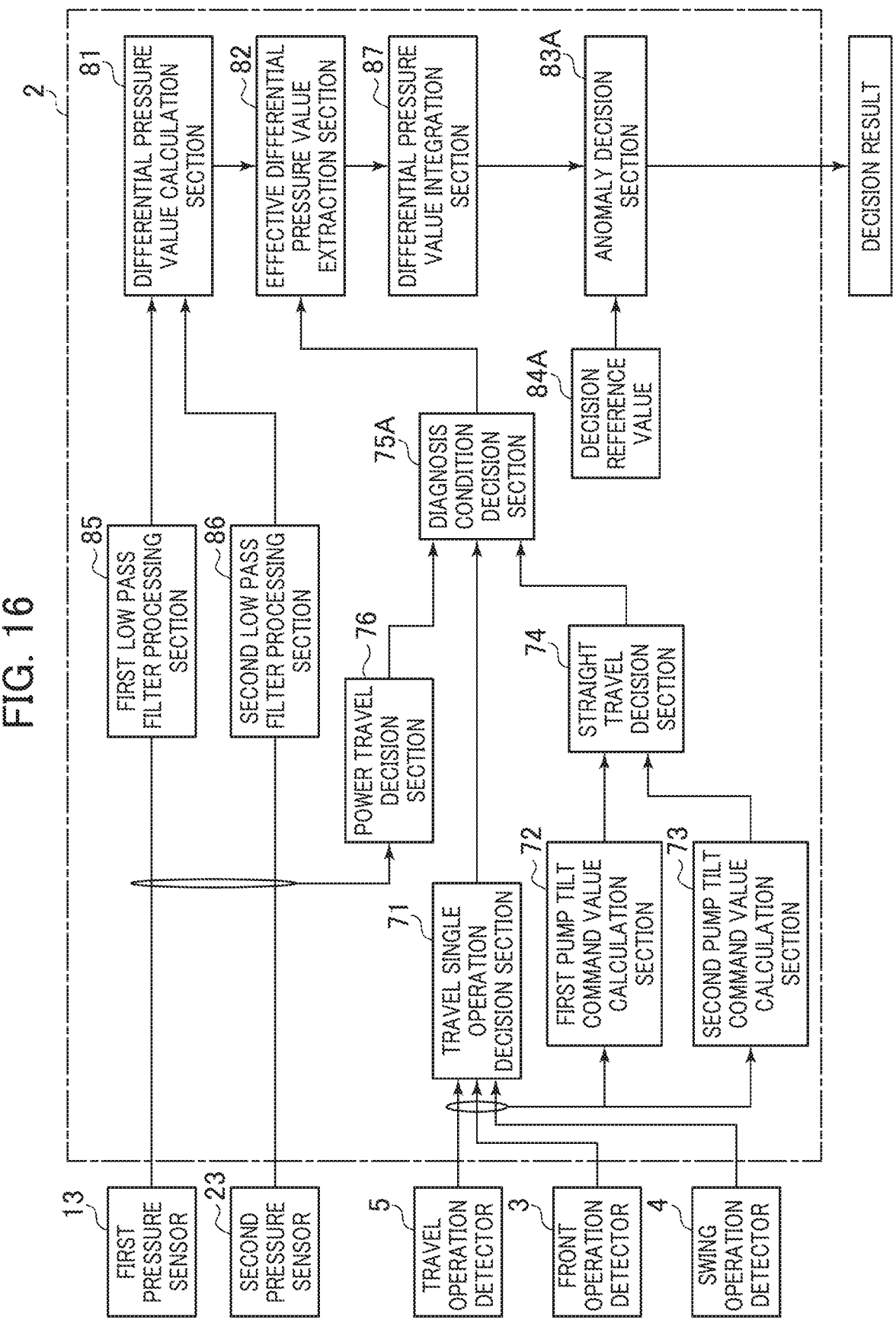
FIG. 16 is a functional block diagram of the controller according to the fourth embodiment.

FIG. 16 is a functional block diagram of the controller 2 according to the fourth embodiment. In the following, differences from the third embodiment (depicted in FIG. 12) are described.

Referring to FIG. 16, the controller 2 further includes a power travel decision section 76 and includes a diagnosis condition decision unit 75A in place of the diagnosis condition decision section 75 (depicted in FIG. 12).

The power travel decision section 76 decides on the basis of a pressure value from the first pressure sensor 13 (a first pump pressure) and a pressure value from the second pressure sensor 23 (a second pump pressure) whether or not the left and right track motors 31 and 32 are in a power travel state, and outputs a result of the decision to the diagnosis condition decision unit 75A. The power travel decision section 76 corresponds to step S31 depicted in FIG. 6.

The diagnosis condition decision unit 75A decides on the basis of decision results from the travel single operation decision section 71, straight travel decision section 74 and power travel decision section 76 whether or not diagnosis conditions are satisfied, and outputs a result of the decision to the effective differential pressure value extraction section 82. Consequently, during regeneration action of the left and right track motors 31 and 32, the differential pressure value calculated by the differential pressure value calculation section 81 is not extracted by the effective differential pressure value extraction section 82, and therefore, anomaly decision for the left and right track devices 50 and 60 by the anomaly decision section 83A is not performed.

Also in the present embodiment configured in such a manner as described above, advantages similar to those of the third embodiment are achieved.

Further, by performing anomaly decision for the left and right track devices 50 and 60 only during power travel of the left and right track motors 31 and 32, the anomaly detection accuracy can be improved.

Fifth Embodiment

A hydraulic excavator according to a fifth embodiment of the present invention is described principally in regard to differences from the first embodiment.

Generally, a work machine such as a hydraulic excavator has a plurality of travel modes such as a turtle or low speed travel mode and a rabbit or high speed travel mode such that the travel speed can be adjusted in accordance with a work. Here, upon low speed travel, since the first and second pump pressures become lower, also the maximum differential pressures of the first and second pump pressures in a normal state of the left and right track devices 50 and 60 become low. On the other hand, upon high speed travel, since the first and second pump pressures become high, also the maximum differential pressures of the first and second pump pressures in a normal state of the left and right track devices 50 and 60 become high.

However, in the first embodiment, since the single decision reference value 84 (depicted in FIG. 7) is used to perform anomaly decision of the left and right track devices 50 and 60, there is the possibility that, depending upon the travel mode, a dispersion may occur in anomaly detection accuracy. For example, in the case where the decision reference value is set to a low value in order to increase the anomaly detection accuracy upon low speed travel, there is the possibility that, upon high speed travel, an anomaly may be detected in error. On the other hand, in the case where the decision reference value is set to a high value in order to raise the anomaly detection accuracy upon high speed travel, there is the possibility that, upon low speed travel, an anomaly may not be detected successfully. The present embodiment suppresses a dispersion in anomaly detection accuracy by changeover of the traveling mode.

Figure 17:
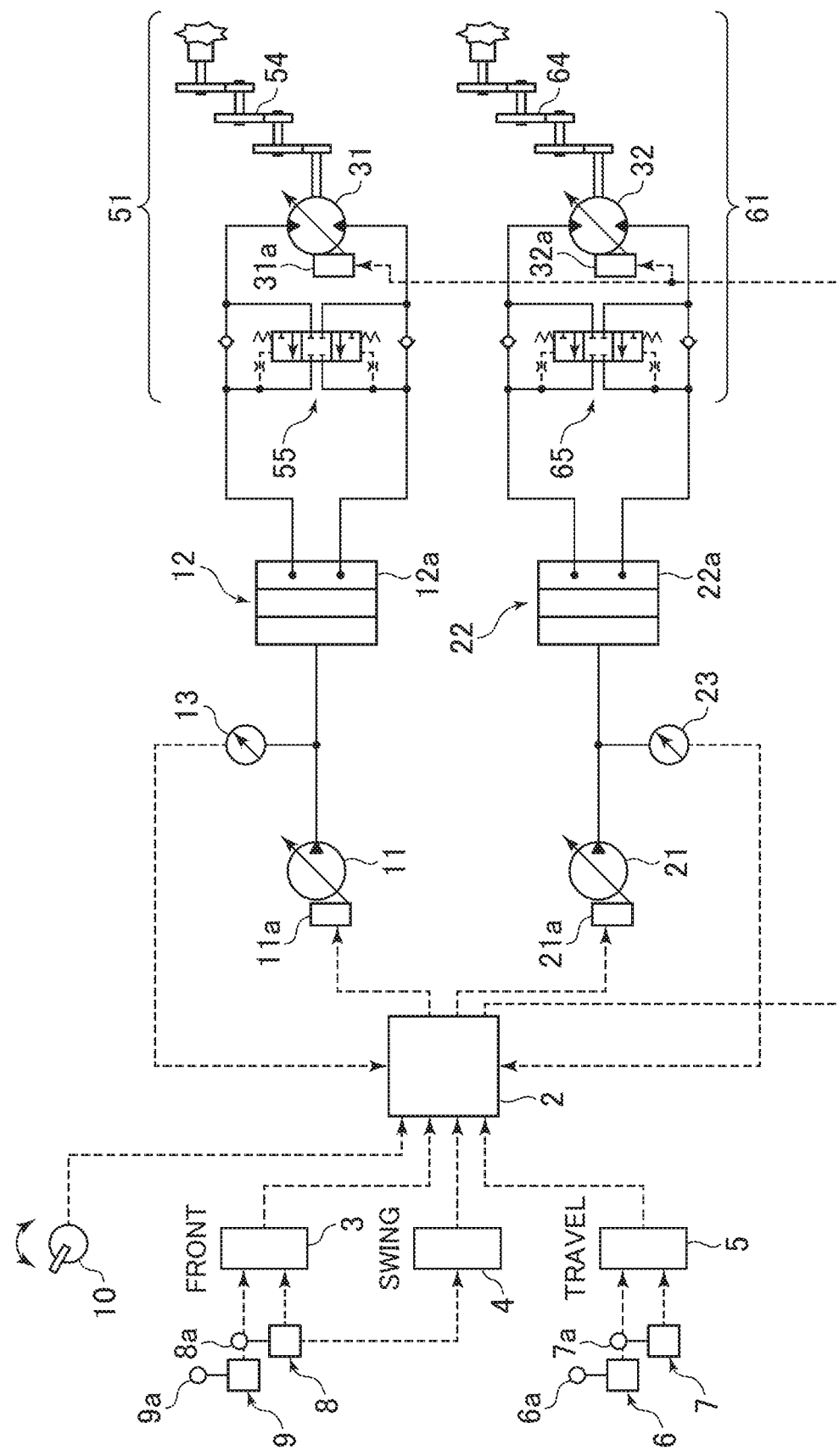
FIG. 17 is a view depicting a track drive system according to a fifth embodiment.

FIG. 17 is a view depicting the travel driving system according to the present embodiment. In the following, differences from the first embodiment (depicted in FIG. 5) are described.

Referring to FIG. 17, the travel drive system according to the present embodiment further includes a travel mode changeover switch 10 as a travel mode selection device for selecting one of travel modes for the left and right track devices 50 and 60. The travel mode changeover switch 10 has a plurality of switch positions corresponding to a plurality of travel modes and outputs a signal (a travel mode signal) corresponding to a current switch position (travel mode) to the controller 2. It is assumed that the track drive system according to the present embodiment includes a turtle or low speed travel mode and a rabbit or high speed travel mode as a plurality of travel modes.

For the left and right track motors 31 and 32, motor regulators 31a and 32a for controlling the motor displacement (the tilt amount) are provided, respectively. The motor regulators 31a and 32a are controlled by command signals from the controller 2.

The controller 2 changes over the motor displacement (tilt amount) of the left and right track motors 31 and 32 in response to a travel mode signal from the travel mode changeover switch 10. In particular, in the case where the travel mode is the turtle, the controller controls the motor regulators 31a and 32a such that the tilt (motor displacement) of the left and right track motors 31 and 32 becomes a great tilt (a great displacement). On the other hand, in the case where the travel mode is the rabbit, the controller controls the motor regulators 31a and 32a such that the tilt or (motor displacement) of the left and right track motors 31 and 32 becomes a small tilt (a small displacement).

Figure 18A:
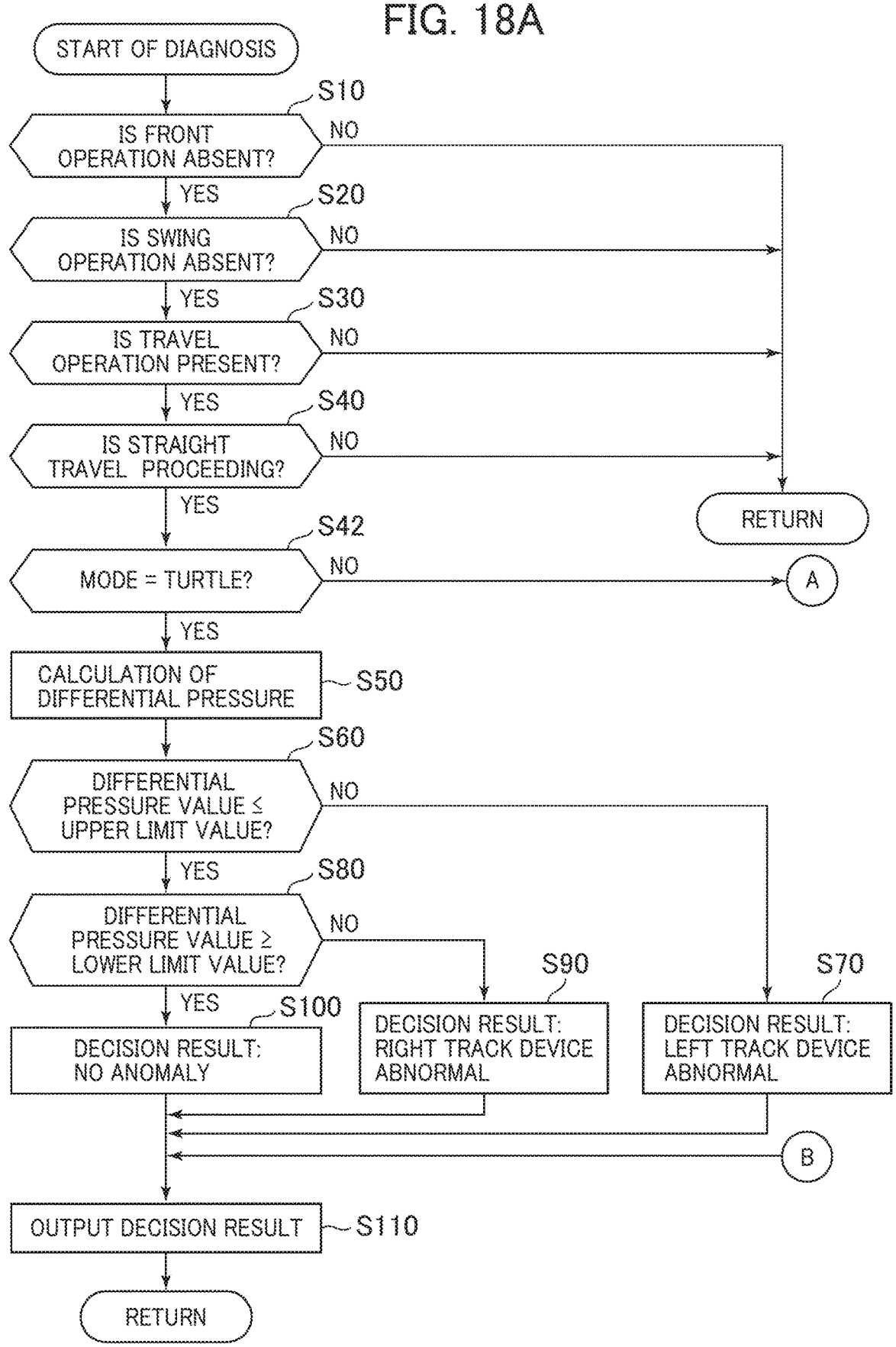
FIG. 18A is a view depicting an anomaly decision flow for the left and right travel devices by the controller according to the fifth embodiment.
Figure 18B:
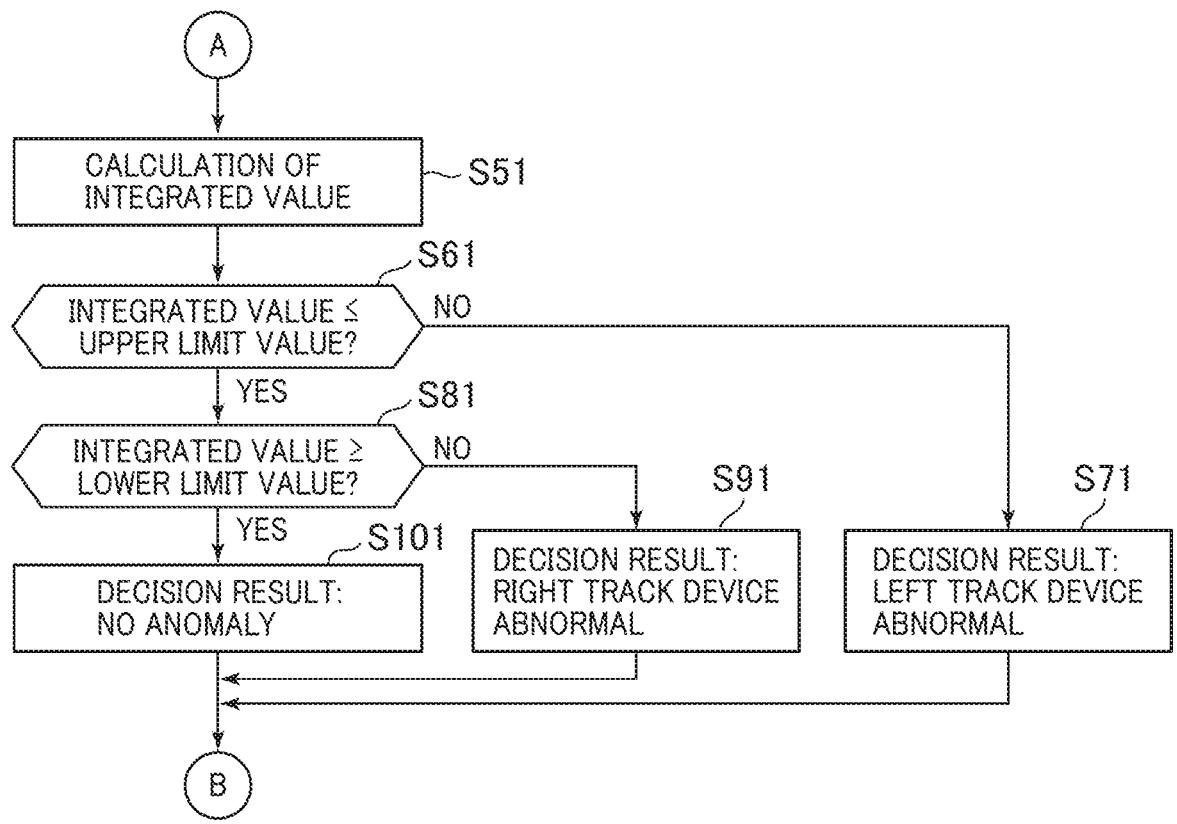
FIG. 18B is a view depicting the anomaly decision flow for the left and right travel devices by the controller according to the fifth embodiment.

FIGS. 18A and 18B are views depicting an anomaly decision flow for the left and right track devices 50 and 60 by the controller 2 according to the present embodiment. In the following, differences from the first embodiment (depicted in FIG. 6) are described.

Referring to FIG. 18A, in the case where it is decided at step S40 that straight travel is proceeding (Yes), it is decided at step S42 whether or not the travel mode is the turtle.

In the case where it is decided at step S42 that the travel mode is the turtle (Yes), processes beginning with step S50 are executed. However, to the predetermined upper limit value at step S60, a decision reference value 84B for the turtle (depicted in FIG. 19) is set, and to the predetermined lower limit value at step S80, a value obtained by setting the sign of the decision reference value 84B for the turtle to negative is set. Further, the decision reference value 84B for the turtle is set to a value lower than a decision reference value 84C for the rabbit (depicted in FIG. 19) hereinafter described. This is because, since, upon low speed travel, the first and second pump pressures are low, the maximum differential pressure of the first and second pump pressures in a normal state of the left and right track devices 50 and 60 is low.

In the case where it is decided at step S41 that the travel mode is not the turtle (No), steps S51, S61, S71, S81, S91 and S101 (depicted in FIG. 18B) at which processes are similar to the processes at steps S50, S60, S70, S80, S90 and S100, respectively, are executed. However, to the predetermined upper limit value at step S61, the decision reference value 84C for the rabbit (depicted in FIG. 19) is set, and to the predetermined lower limit value at step S81, a value obtained by setting the sign of the decision reference value for the rabbit to negative is set. Further, the decision reference value 84C for the rabbit is set to a value higher than the decision reference value 84B for the turtle. This is because, upon high speed travel, since the first and second pump pressures are high, the maximum differential pressure of the first and second pump pressures in a normal state of the left and right track devices 50 and 60 is high.

Figure 19:
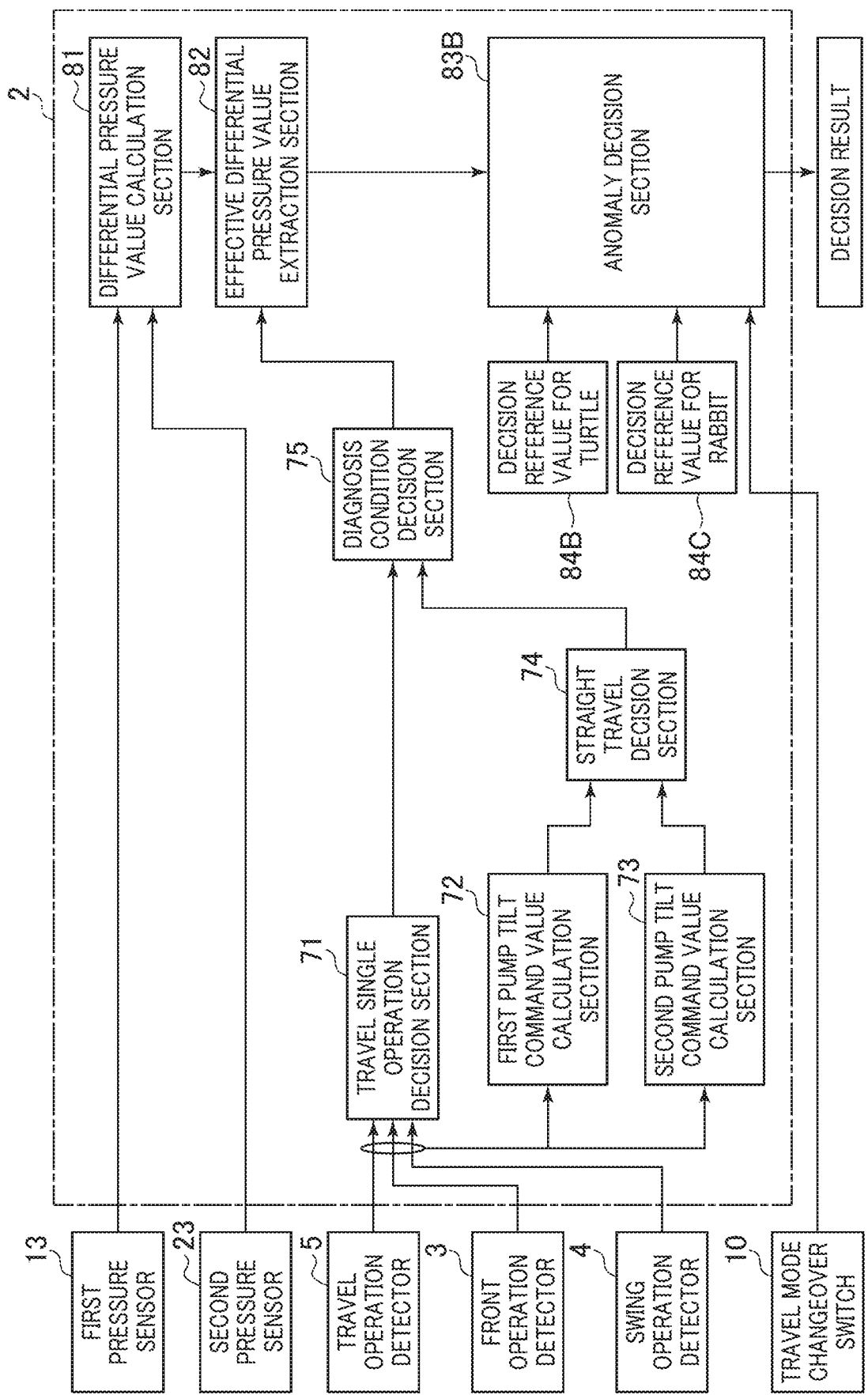
FIG. 19 is a functional block diagram of the controller according to the fifth embodiment.

FIG. 19 is a functional block diagram of the controller 2 according to the present embodiment. In the following, differences from the functional block diagram (depicted in FIG. 7) are described.

Referring to FIG. 19, the controller 2 according to the present embodiment includes an anomaly decision section 83B in place of the anomaly decision section 83 (depicted in FIG. 7) and includes the decision reference value 84B for the turtle and the decision reference value 84C for the rabbit in place of the decision reference value 84 (depicted in FIG. 7). To the anomaly decision section 83B, a travel mode signal from the travel mode changeover switch 10 is inputted.

In the case where a travel mode signal corresponding to the low speed travel mode (to the turtle) is inputted from the travel mode changeover switch 10, anomaly decision is performed using the decision reference value 84B for the turtle. On the other hand, in the case where a travel mode signal corresponding to the high speed travel mode (to the rabbit) is inputted from the travel mode changeover switch 10, anomaly decision is performed using the decision reference value 84C for the rabbit. The anomaly decision section 83B corresponds to steps S60, S61, S70, S71, S80, S81, S90, S91, S100, S101 and S110 depicted in FIGS. 18A and 18B.

Also with the present embodiment configured in such a manner as described above, similar advantages to those of the first embodiment can be achieved.

Further, by changing over between the decision reference values 84B and 84C in response to the travel mode, an anomaly of the left and right track devices 50 and 60 can be detected without being influenced by changeover of the travel mode.

Although the embodiment of the present invention has been described in detail, the present invention is not limited to the embodiment described above but includes various modifications. For example, the above-described embodiment has been described in detail in order to describe the present invention so as to facilitate understandings and is not limited to configurations that include all components described above. Further, it is possible to add components of a certain embodiment to the components of a different embodiment, and also it is possible to delete part of components of a certain embodiment or replace part of components of a certain embodiment with the components of a different embodiment.

DESCRIPTION OF REFERENCE CHARACTERS

1: Engine (prime mover)
2: Controller (controller)
3: Front operation detector (work operation detector)
4: Swing operation detector (work operation detector)
5: Travel operation detector
7: Left travel lever device (travel operation device)
6a: Left travel lever
7: Right travel lever device (travel operation device)
7a: Right travel lever
8: Left operation lever device (work operation device)
8a: Left operation lever
9: Right operation lever device (work operation device)
9a: Right operation lever
10: Travel mode changeover switch
11: First pump (first hydraulic pump)
11a: Pump regulator
12: First control valve unit
12a: Left track directional control valve
13: First pressure sensor (first pressure detector)
21: Second pump (second hydraulic pump)
21a: Pump regulator
22: Second control valve unit
22a: Right track directional control valve
23: Second pressure sensor (second pressure detector)
31: Left track motor (left track hydraulic motor)
31a: Motor regulator
32: Right track motor (right track hydraulic motor)
32a: Motor regulator
33: Boom cylinder (hydraulic actuator)
34: Arm cylinder (hydraulic actuator)
35: Bucket cylinder (hydraulic actuator)
36: Swing motor (hydraulic actuator)
37: Attachment hydraulic actuator (hydraulic actuator)
41: Track frame
42: Swing wheel
43: Center joint
44: Conduit
50: Left track device
51: Left track drive device
52: Left crawler belt
53: Left front idler
54: Left travel speed reducer
55: Left brake valve
60: Right track device
61: Right track drive device
62: Right crawler belt
63: Right front idler
64: Right travel speed reducer
65: Right brake valve
71: Travel single operation decision section
72: First pump tilt command value calculation section
73: Second pump tilt command value calculation section
74: Straight travel decision section
75, 75A: Diagnosis condition decision section
76: Power travel decision section
81: Differential pressure value calculation section
82: Effective differential pressure value extraction section
83, 83A, 83B: Anomaly decision section
84, 84A, 84B, 84C: Decision reference value
85: First low pass filter processing section
86: Second low pass filter processing section
87: Differential pressure value integration section
100: Hydraulic excavator
101: Lower track structure
102: Upper swing structure
103: Front work implement
104: Boom
105: Arm
106: Bucket
110: Operation room
200: Hydraulic drive system

The invention claimed is:

1. A hydraulic work machine, comprising:
a first hydraulic pump and a second hydraulic pump of variable displacement type;
a left track device including a left track hydraulic motor driven by hydraulic fluid supplied from the first hydraulic pump;
a right track device including a right track hydraulic motor driven by hydraulic fluid supplied from the second hydraulic pump;
a hydraulic actuator driven by hydraulic fluid supplied from at least one of the first hydraulic pump and the second hydraulic pump;
a work implement driven by the hydraulic actuator;
a travel operation device for operating the left track device and the right track device;
a work operation device for operating the work implement;
a controller that controls pump displacements of the first hydraulic pump and the second hydraulic pump in response to an operation of the travel operation device;
a travel operation detector that detects operation contents of the travel operation device; and
a work operation detector that detects operation contents of the work operation device, wherein
the hydraulic work machine further comprises:
a first pressure detector configured to detect a first pump pressure that is a delivery pressure of the first hydraulic pump; and
a second pressure detector configured to detect a second pump pressure that is a delivery pressure of the second hydraulic pump,
when the controller decides from detection results of the travel operation detector and the work operation detector that the work implement is not operated but the travel operation device is operated and besides the left track device and the right track device are straightly traveling, the controller calculates an anomaly decision evaluation value based on a value obtained by subtracting one from other of the first pump pressure and the second pump pressure and decides based on a result of comparison between the anomaly decision evaluation value and a predetermined decision reference value that one of the left track device and the right track device has an anomaly.

2. The hydraulic work machine according to claim 1, wherein
the controller decides that, when a difference between a pump displacement of the first hydraulic pump and a pump displacement of the second hydraulic pump is smaller than a predetermined threshold value, the left track device and the right track device are straightly traveling.

3. The hydraulic work machine according to claim 1, wherein,
before calculating the anomaly decision evaluation value, the controller performs a low pass filter process for the pressure values detected by the first pressure detector and the second pressure detector.

4. The hydraulic work machine according to claim 1, wherein
the controller subtracts one from other of the first pump pressure and the second pump pressure to calculate a value as the anomaly decision evaluation value.

5. The hydraulic work machine according to claim 1, wherein
the controller calculates an integrated value of a value obtained by subtracting one from other of the first pump pressure and the second pump pressure as the anomaly decision evaluation value.

6. The hydraulic work machine according to claim 1, wherein,
where the first pump pressure or the second pump pressure is lower than a predetermined pressure, the controller does not calculate the anomaly decision evaluation value.

7. The hydraulic work machine according to claim 1, further comprising:
a travel mode selection device for selecting one of travel modes for the left track device and the right track device, wherein
each of the left travel hydraulic motor and the right travel hydraulic motor is a hydraulic motor of the variable displacement type,
the controller controls a motor displacement of each of the left travel hydraulic motor and the right travel hydraulic motor in response to a travel mode selected by the travel mode selection device, and
the controller calculates the anomaly decision evaluation value for each travel mode selected by the travel mode selection device and changes over the predetermined decision reference value in response to the travel mode selected by the travel mode selection device.

\* \* \* \* \*